US007632369B2

(12) United States Patent  
Sato et al.

(10) Patent No.: US 7,632,369 B2
(45) Date of Patent: Dec. 15, 2009

(54) GREEN SHEET SLURRY, GREEN SHEET, PRODUCTION METHOD OF GREEN SHEET SLURRY, PRODUCTION METHOD OF GREEN SHEET, AND PRODUCTION METHOD OF ELECTRONIC DEVICE

(75) Inventors: Shigeki Sato, Chuo-ku (JP); Thoru Tonogai, Chuo-ku (JP); Toshio Sakurai, Chuo-ku (JP); Hisashi Kobayashi, Chuo-ku (JP); Tomoko Nakamura, Chuo-ku (JP); Takeshi Nomura, Chuo-ku (JP)

(73) Assignee: TDK Corporation, Tokyo (JP)

( * ) Notice: Subject to any disclaimer, the term of this patent is extended or adjusted under 35 U.S.C. 154(b) by 581 days.

(21) Appl. No.: 10/543,760

(22) PCT Filed: Jan. 28, 2004

(86) PCT No.: PCT/JP2004/000755

§ 371 (c)(1),
(2), (4) Date: Jul. 28, 2005

(87) PCT Pub. No.: WO2004/067475

PCT Pub. Date: Aug. 12, 2004

(65) Prior Publication Data

US 2006/0096692 A1 May 11, 2006

(30) Foreign Application Priority Data

Jan. 29, 2003 (JP) ............................. 2003-020167

(51) Int. Cl.
*C08K 3/10* (2006.01)
*C08L 29/04* (2006.01)

(52) U.S. Cl. ..................... 156/89.11; 524/297; 524/413; 524/557

(58) Field of Classification Search ................. 524/297, 524/557; 156/89.11
See application file for complete search history.

(56) References Cited

U.S. PATENT DOCUMENTS

| 4,540,621 | A | * | 9/1985 | Eggerding et al. | ........... 428/209 |
| 4,704,418 | A | * | 11/1987 | Gomez | ........................ 524/141 |
| 7,355,838 | B2 | * | 4/2008 | Kobayashi et al. | ........ 361/321.1 |
| 7,388,739 | B2 | * | 6/2008 | Abe et al. | ................ 361/321.1 |
| 7,485,244 | B2 | * | 2/2009 | Nakamura et al. | ........... 252/512 |
| 2001/0002606 | A1 | | 6/2001 | Nakamura et al. | |

FOREIGN PATENT DOCUMENTS

| JP | 62096358 A | * | 5/1987 |
| JP | A 4-317453 | | 11/1992 |
| JP | A 6-56501 | | 3/1994 |
| JP | A 06-72760 | | 3/1994 |
| JP | A 6-191921 | | 7/1994 |
| JP | A 6-206756 | | 7/1994 |
| JP | 09150425 A | * | 6/1997 |
| JP | A 10-67567 | | 3/1998 |
| JP | 10245246 A | * | 9/1998 |
| JP | A 2001-106580 | | 4/2001 |
| JP | A 2001-163675 | | 6/2001 |
| JP | A 2002-43164 | | 2/2002 |
| JP | A 2002-321981 | | 11/2002 |

OTHER PUBLICATIONS

Machine translation of JP 09-150425, Jun. 10, 1997.*
Derwent 1987-160899 for JP 62-96358 A, May 2, 1987.*
Machine translation of JP 10-245246 A, Sep. 14, 1998.*
Machine translation of JP 06-206756 A, Jul. 26, 1994.*
English-language translation of JP 62-096358 A, May 2, 1987.*
Cho, Chae-Woong et al.; "Effects of PVB on the gelation behavior of $BaTiO_3$-based dielectric particles and glass suspension"; Journal of the European Ceramic Society (Dec. 1, 2003) pp. 2315-2322; vol. 23, No. 13; Elsevier Science Publishers; Barking, Essex, Great Britain.
Matsushita, Haruhiko; "An Improved 6-μm Green Sheet for a High-Capacitance Multilayered Ceramic Capacitor"; Journal of Materials Synthesis and Processing (May 1, 1998) pp. 209-214; vol. 6 No. 3; Plenum Publishing Corporation; New York, NY, USA.
Luo, Xiao-Jun et al.; "Effects of organic additives and glass on the properties of AlN/glass tape-casting slurries and green tapes"; Journal of Materials Science (Jul. 1, 2004) pp. 4387-4389; vol. 39, No. 13; Kluwer Academic Publishers.
Garcia Dos Santos, Ieda Maria et al.; "Rheological properties of tin oxide suspensions"; Journal of the European Ceramic Society (Aug. 1, 2002) pp. 1297-1306; vol. 22 No. 8; Elsevier Science Publishers; Barking, Essex, Great Britain.
Li, Mingwei et al.; "Fabrication of $ZrO_2$/Mo-Si/Ni Functionally Graded Material by Dip-Coating"; Journal of Materials Science and Technology (Jan. 1, 2003) pp. 63-65; vol. 19, No. 1.
Jingxian, Zhang et al.; "Binary solvent mixture for tape casting of $TiO_2$ sheets"; Journal of the European Ceramic Society (Jan. 1, 2004) pp. 147-155; vol. 24, No. 1; Elsevier Science Publishers; Barking, Essex, Great Britain.

* cited by examiner

*Primary Examiner*—Vickey Nerangis
(74) *Attorney, Agent, or Firm*—Oliff & Berridge, PLC

(57) ABSTRACT

A green sheet slurry, characterized by including ceramic powder, a binder resin, a plasticizer and a solvent, wherein the binder resin contains a polyvinyl butyral resin, a polymerization degree of the polybutyral resin is 1000 or more and 1700 or less, a nominal value of a butyralation degree of the resin is 65% or higher and 78% or lower, and a residual acetyl group amount is smaller than 6%.

7 Claims, 8 Drawing Sheets

GREEN SHEET SLURRY, GREEN SHEET, PRODUCTION METHOD OF GREEN SHEET SLURRY, PRODUCTION METHOD OF GREEN SHEET, AND PRODUCTION METHOD OF ELECTRONIC DEVICE

TECHNICAL FIELD

The present invention relates to a green sheet slurry, a green sheet, a production method of a green sheet slurry, a production method of a green sheet, and a production method of an electronic device and, particularly relates to a slurry, green sheet and a method capable of producing a green sheet having excellent handlability and adhesiveness even in the case of an extremely thin sheet and suitable to making an electronic device a thin layer and multilayer.

BACKGROUND ART

In recent years, as a variety of electronic equipments become compact, electronic devices to be installed inside the electronic equipments have become smaller and higher in performance. As one of the electronic devices, there is a ceramic electronic device, such as a CR built-in substrate and a multilayer ceramic capacitor, and the ceramic electronic devices have been required to be smaller and higher in performance.

To pursue a smaller ceramic electronic device having a higher capacitance, there is a strong demand for thinking a dielectric layer. Recently, a thickness of a dielectric green sheet has become about μm or less.

To produce a ceramic green sheet, normally, a ceramic slurry composed of ceramic powder, a binder (an acrylic based resin and a butyral based resin, etc.), a plasticizer (phthalate esters, glycols, adipic acids, and phosphoric esters) and an organic solvent (toluene, MEK (Methyle Ethyle keton) and acetone, etc.) are prepared. Next, the ceramic slurry coated on a carrier film (a carrier film made by PET and PP) by using the doctor blade method, etc. and dried by heating.

Also, a method of producing by preparing a ceramic slurry wherein the ceramic powder and binder are mixed in a solvent, then, 2-Dimensional drawing a film-shaped item obtained by extruding slurry has been considered in recent years.

A method of producing a multilayer ceramic capacitor by using the ceramic green sheet explained above will be explained in detail. An internal electrode conductive paste containing metal powder and a binder is printed to be a predetermined pattern on the ceramic green sheet and dried to form an internal electrode pattern. After that, the green sheet is peeled from the carrier film and stacked by a predetermined number of layers. Here, two methods are proposed, that are a method of peeling the green sheet from the carrier film before stacking in layers and a method of peeling the carrier film after stacking in layers and adhering by compression, but the difference is not large. Finally, the stacked body is cut to be chips, so that green chips are prepared. After firing the green chips, external electrodes are formed, so that a multilayer ceramic capacitor and other electronic devices are produced.

When producing a multilayer ceramic capacitor, an interlayer thickness of sheets formed with internal electrodes is in a range of 3 μm to 100 μm or so based on a desired capacitance required as a capacitor. Also, in a multilayer ceramic capacitor, a part not formed with internal electrodes is formed on an outer part in the stacking direction of the capacitor chip.

In such a multilayer ceramic capacitor, it was general to use a polyvinyl butyral resin having a polymerization degree of 1000 or less (Mw=50,000) as a binder to be used (refer to the patent article 1 below: the Japanese Patent Publication No. 10-67567). As the reasons, to sufficiently secure adhesiveness of ceramic green sheets at the time of stacking, to reduce surface roughness of the green sheets, to secure plasticity of the green sheets, and to reduce viscosity of slurry may be mentioned. As a plasticizer, generally, phthalic acid, adipic acid, sebacic acid, and phosphoric esters can be used, which were selected in terms of a boiling point and hazardous property, etc. in an object of giving plasticity.

In recent years, as electronic equipments become more compact, electronic devices to be used therein have rapidly become more compact. In multilayer electronic devices as typified by a multilayer ceramic capacitor, rapid development has been made on increasing the number of layers to be stacked and attaining a thinner interlayer thickness. To respond to the technical trends, a thickness of a green sheet, which determines the interlayer thickness, has almost become 3 μm or less to 2 μm or less. Therefore, in a production process of a multilayer ceramic capacitor, it is necessary to handle extremely thin green sheets and to design very advanced green sheet properties.

As characteristics required as the properties of such an extremely thin green sheet, sheet strength, flexibility, smoothness, adhesiveness when being stacked, handlability (electrostatic property), etc. may be mentioned, and balance of a higher order is required.

Note that, as shown in the patent article 2: the Japanese Unexamined Patent Publication No. 6-206756, there is known a technique of using a polyvinyl butyral resin having a polymerization degree of 1000 or more as a binder in green sheet slurry containing an aqueous solvent for a purpose of eliminating a short-circuiting defect.

However, the patent article 2 is not for particularly attaining a thinner organic solvent based green sheet, and a range of a polymerization degree of a polyvinyl butyral resin is not limited to a specified range. Moreover, a butyralation degree and a residual acetyl group amount of the resin are not focused at all.

DISCLOSURE OF THE INVENTION

An object of the present invention is to provide a green sheet slurry, a green sheet, a production method of a green sheet slurry and a production method of a green sheet capable of producing a green sheet having enough strength to be peeled from a carrier film, preferable adhesiveness and handlability even if the green sheet is extremely thin. Also, another object of the present invention is to provide a production method of an electronic device suitable to be made thinner and multilayer.

The present inventors have been committed themselves to study to attain the above objects, found that it was possible to produce a green sheet having enough strength to be peeled from a supporting body, preferable adhesiveness and handlability even if the green sheet was extremely thin, by using as a binder a polyvinyl acetal resin having a polymerization degree in a specific range and a residual acetyl group amount of a predetermined value or smaller, and completed the present invention.

Namely, a green sheet slurry according to a first aspect of the present invention is characterized by including ceramic powder, a binder resin, a plasticizer and a solvent, wherein the binder resin contains a polyvinyl butyral resin, a polymerization degree of the polybutyral resin is 1000 or more and 1700 or less, a nominal value of a butyralation degree of the resin is 65% or higher and 78% or lower, and a residual acetyl group amount is smaller than 6%. The solvent is not particularly limited and an organic solvent is preferably used. Note that a nominal value of the butyralation degree varies in a range of ±3%. Namely, a nominal value of a butyralation degree of 65% means 65±3%. In the following explanation, when referring simply by "a butyralation degree", it means "a nominal value of a butyralation degree".

In the first aspect of the present invention, when the polymerization degree of the polybutyral resin is too low, it is liable that sufficient mechanical strength is hard to be obtained in the case of making the layer thinner, for example, to 5 μm or less, preferably 3 μm or less. While when the polymerization degree is too high, it is liable that surface roughness is increased when made to be a sheet. Also, when a butyralation degree of the polybutyral resin is too low, solubility in a slurry tends to become poor, while when too high, surface roughness of the sheet tends to decline. Furthermore, when a residual acetyl group amount is too large, surface roughness of the sheet tends to decline.

According to the green sheet slurry according to the first aspect of the present invention, it is possible to produce a green sheet having enough strength to be peeled from a supporting body, preferable adhesiveness and handlability even if the green sheet is extremely thin.

A green sheet slurry according to a second aspect of the present invention includes ceramic powder, a binder resin, a plasticizer and an organic solvent, wherein
water is contained by 1 part by weight or more and 6 parts by weight or less with respect to 100 parts by weight of the ceramic powder.

Conventionally, a green sheet slurry using an organic solvent had to be properly managed in order not to be mixed with water to prevent the characteristics from changing due to absorbing moisture. In the second aspect of the present invention, water is positively mixed by a content in a predetermined range from the beginning of producing the slurry. Therefore, in the present invention, it is not necessary to strictly manage water absorbance due to moisture.

When the water content is too low, characteristics of the slurry widely change over time due to moisture absorbance, which is preferable, the viscosity tends to increase in the slurry, and filtration properties tend to deteriorate in the slurry. While, when the water content is too high, separation and precipitation of the slurry are caused, the dispersibility becomes poor and surface roughness of the sheet tends to decline.

A green sheet slurry according to a third aspect of the present invention is characterized by including ceramic powder, a binder resin, a plasticizer, a solvent, and a dispersant, wherein:
the dispersant contains polyethylene glycol based nonionic dispersant, and a hydrophile-lipophile balance vale is 5 to 6; and
the dispersant is added by 0.5 part by weight or more and 1.5 parts by weight or less with respect to 100 parts by weight of ceramic powder.

In the case where the dispersant is not a polyethylene glycol based nonionic dispersant, it is liable that the viscosity increases in the slurry, sheet density declines, sheet surface roughness increases, and sheet stretching property declines. Also, when the HLB of the dispersant is out of the above range, it is liable that the sheet density declines and sheet surface roughness increases.

According to the green sheet slurry according to the third aspect of the present invention, it is possible to produce a green sheet having enough strength to be peeled from a supporting body, preferable adhesiveness and handlability even if the green sheet is extremely thin.

Also, in the third aspect of the present invention, when an adding quantity of the dispersant is too small, it is liable that viscosity increases in the slurry, sheet density declines and sheet surface roughness increases. Also, when the adding quantity is too large, it is liable that tensile strength of the sheet declines and adhesiveness also declines.

A green sheet slurry according to a fourth aspect of the present invention is characterized by including ceramic powder, a binder resin, a plasticizer, a solvent, and an antistatic agent, wherein
the antistatic agent contains an imidazoline based antistatic agent, and the antistatic agent is contained by 0.1 part by weight or more and 0.75 part by weight or less with respect to 100 parts by weight of the ceramic powder.

In the fourth aspect of the present invention, when the antistatic agent is not an imidazoline based antistatic agent, the antistatic effect is small and sheet strength, sheet ductility or adhesiveness tends to decline. According to the green sheet slurry according to the fourth aspect of the present invention, it is possible to produce a green sheet having enough strength to be peeled from a supporting body, capable of suppressing static electricity electrostatic generated at the time of being peeled from the supporting body, etc., and having preferable adhesiveness and handlability even if the green sheet is extremely thin.

In the fourth aspect of the present invention, when the adding quantity of the antistatic agent is too small, the antistatic effect tends to reduce, while when too large, it is liable that the sheet surface roughness increase and sheet strength decrease poor.

A green sheet slurry according to a fifth aspect of the present invention includes ceramic powder, a binder resin, and a solvent, and may include plasticizer and dispersant if necessary, wherein
the solvent contains an alcohol based solvent and an aromatic solvent, and the aromatic solvent is contained by 10 parts by weight or more and 20 parts by weight or less when assuming that total weight of the alcohol based solvent and aromatic solvent is 100 parts by weight. When a content of the aromatic solvent is too small, the sheet surface roughness tends to increase, while when too large, the slurry filtration properties decline and sheet surface roughness also declines by increasing.

Preferably, the binder resin is contained by 5 parts by weight or more and 6.5 parts by weight or less with respect to 100 parts by weight of the ceramic powder. When a content of the binder resin is too small, it is liable that the sheet strength declines- and stackability (adhesiveness at the time of stacking in layers) declines. Also, when a content of the binder resin is too large, it is liable that segregation of the binder resin is caused to deteriorate the dispersibility and sheet surface roughness declines.

Preferably, diotycle phthalate is contained as the plasticizer by 40 parts by weight or more and 70 parts by weight or less with respect to 100 parts by weight of the binder resin. Comparing with other plasticizers, dioctyl phthalate is preferable in terms of both of sheet strength and sheet ductility, and particularly preferable because the release strength from a supporting body is small and it is easily peeled. Note that when a content of the plasticizer is too small, it is liable that sheet stretching becomes less and flexibility becomes less. Also, when the content is too large, it is liable that breedout of the plasticizer from the sheet is caused, segregation of the plasticizer is easily caused against the sheet, and the sheet dispersibility declines.

Preferably, when assuming that total volume of the ceramic powder, binder resin and plasticizer is 100 volume %, a volume ratio accounted by the ceramic powder is 64.3% or higher and 72% or lower. When the volume ratio is too small, it is liable that segregation of a binder is easily caused to deteriorate the dispersibility, and the surface roughness declines. While when the volume ratio is too large, it is liable that the sheet strength declines and stackability also declines.

Preferably, at least one of a hydrocarbon based solvent, industrial gasoline, kerosene and solvent naphtha is added by 3 parts by weight or more and 15 parts by weight or less with respect to 100 parts by weight of the ceramic powder. By adding these additives, the sheet strength and sheet surface roughness can be improved. When an adding quantity of these additives is too small, effects of adding is small, while when the adding quantity is too large, it is liable that the sheet strength and sheet surface roughness decline inversely.

A production method of a green sheet slurry according to the present invention is characterized in that the binder resin is dissolved in an alcohol based solvent of at least one kind of methanol, ethanol, propanol and butanol and filtered to make a solution in advance, and the ceramic powder and other components are added to the solution.

A binder resin having a high polymerization degree is hard to be dissolved in a solvent, and dispersibility of a slurry tends to decline in a normal method in a method of the present invention, a binder resin having a high polymerization degree is dissolved in a good solvent as explained above, and ceramic powder and other components are added to the solution, so that dispersibility of a slurry can be improved and generation of undissolved resin can be suppressed. Note that solid content concentration cannot be raised and changes of lacquer viscosity tend to become large over time in the case of a solvent other than the above solvents.

A production method of a ceramic green sheet according to the present invention includes:

a step of preparing the above green sheet slurry; and a step of forming a ceramic green sheet by using the green sheet slurry.

A production method of a ceramic electronic device according to the present invention includes:

a step of preparing the above green sheet slurry;

a step of forming a ceramic green sheet by using the green sheet slurry;

a step of drying the green sheet;

a step of stacking dried green sheets via internal electrode layers to obtain a green chip; and a step of firing the green chip.

The green sheet according to the present invention is produced by using the above green sheet slurry.

BRIEF DESCRIPTION OF DRAWINGS

Below, the present invention will be explained based on embodiments shown in drawings.

BEST MODE FOR CARRYING OUT THE INVENTION

First, as an embodiment of an electronic device produced by using a green sheet slurry (dielectric paste) and a green sheet according to the present invention, an overall configuration of a multilayer ceramic capacitor will be explained.

Figure 1:
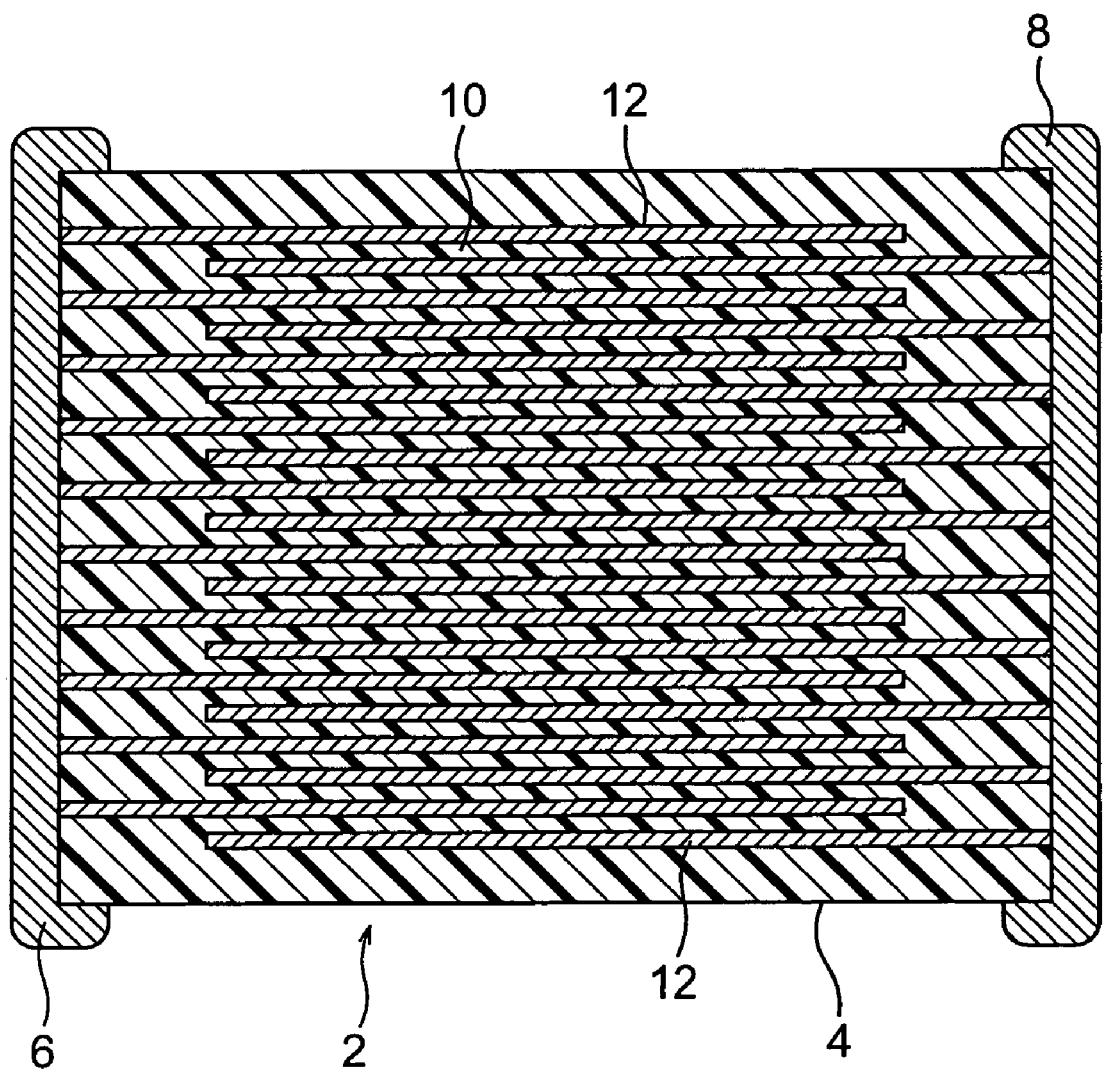
FIG. 1 is a schematic sectional view of a multilayer ceramic capacitor according to an embodiment of the present invention.

As shown in FIG. 1, a multilayer ceramic capacitor 2 according to the present embodiment comprises a capacitor element 4, a first terminal electrode 6 and a second terminal electrode 8. The capacitor element 4 comprises dielectric layers 10 and internal electrode layers 12, and the internal electrode layers 12 are stacked alternately between the dielectric layers 10. The alternately stacked internal electrode layers 12 on one side are electrically connected to inside of the first terminal electrode 6 formed outside of one end portion of the capacitor element 4. Also, the alternately stacked internal electrode layers 12 on the other side are electrically connected to inside of the second terminal electrode 8 formed outside of the other end portion of the capacitor element 4.

In the present embodiment, an internal electrode layer 12 is formed by transferring an electrode layer 12a to a ceramic green sheet 10a as shown in FIG. 2 to FIG. 6 as will be explained later on.

A material of the dielectric layer 10 is not particularly limited and composed of a dielectric material, for example, calcium titanate, strontium titanate and/or barium titanate, etc. A thickness of each of the dielectric layers 10 is not particularly limited, but those having a thickness of several μm to several hundreds of μm are general. Particularly in the present embodiment, it is made to be thin as preferably 5 μm or less, and more preferably 3 μm or less.

A material of the terminal electrodes 6 and 8 is not particularly limited, however, copper, a copper alloy, nickel and a nickel alloy, etc. are normally used. An alloy of silver and silver with palladium may be also used. A thickness of the terminal electrodes 6 and 8 is not particularly limited, however, but is normally 10 to 50 μm or so.

A shape and size of the multilayer ceramic capacitor 2 may be suitably determined in accordance with the object and use. When the multilayer ceramic capacitor 2 has a rectangular parallelepiped shape, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of production methods of the multilayer ceramic capacitor 2 according to the present embodiment will be explained.

(1) First, a dielectric slurry (green sheet slurry) is prepared to produce a ceramic green sheet for composing the dielectric layers 10 shown in FIG. 1 after firing.

The dielectric slurry is composed of an organic solvent based slurry obtained by dispersing a dielectric material (ceramic powder) and an organic vehicle.

The dielectric material is suitably selected from a variety of compounds which become composite oxides or oxides, such as carbonates, nitrites, hydroxides, and organic metal compounds, and mixed for use. The dielectric material is normally used as powder having an average particle diameter of 0.4 µm or less, and preferably 0.1 to 3.0 µm or less or so. Note that it is preferable to use finer powder than the green sheet thickness to form an extremely thin green sheet.

The organic vehicle is obtained by dissolving a binder resin in an organic solvent. As the binder resin used for the organic vehicle, a polyvinyl butyral resin is used in the present embodiment. A polymerization degree of the polybutyral resin is 1000 or higher and 1700 or lower, and preferably 1400 to 1700. Also, a butyralation degree of the resin is 65% or higher and 78% or lower, and preferably 65% or higher and 70% or lower, and the residual acetyl group amount is less than 6% and preferably 3% or less.

The polymerization degree of the polybutyral resin can be measured, for example, by a polymerization degree of a polyvinyl acetal resin as a material. Also, the butyralation degree can be measured, for example, based on the JISK6728. Furthermore, the residual acetyl group amount can be measured based on the JISK6728.

When the polymerization degree of the polybutyral resin is too low, it is liable that sufficient mechanical strength is hard to be obtained when made to be a thin film of, for example, 5 µm or less, and preferably 3 µm or less or so. Also, when the polymerization degree is too large, surface roughness tends to decline when made to be a sheet. Also, when the butyralation degree of the polybutyral resin is too low, solubility in a slurry tends to decline, while when too high, sheet surface roughness tends to decline. Furthermore, when the residual acetyl group amount is too large, sheet surface roughness tends to decline.

An organic solvent to be used for an organic vehicle is not particularly limited and an organic solvent, such as terpionel, alcohol, butyl carbitol, acetone and toluene, is used. In the present embodiment, the organic solvent preferably contains an alcohol based solvent and an aromatic solvent, and the aromatic solvent is contained by 10 parts by weight or more and 20 parts by weight or less when assuming total weight of the alcohol based solvent and aromatic solvent is 100 parts by weight. When a content of the aromatic solvent is too small, sheet surface roughness tends to increase, while when too large, the slurry filtration properties decline and sheet surface roughness also declines by increasing.

As an alcohol based solvent, methanol, ethanol, propanol and butanol, etc. may be mentioned. As an aromatic solvent, toluene, xylene and benzyl acetate, etc. may be mentioned.

It is preferable that a binder resin is dissolved in an alcohol based solvent of at least one kind of methanol, ethanol, propanol and butanol and filtered to be a solution in advance, and dielectric powder and other components are added to the solution. A binder resin having a high polymerization degree is hard to be dissolved in a solvent, and dispersibility of a slurry tends to decline in a normal method. In a method of the present embodiment, a binder resin having a high polymerization degree is dissolved in the above good solvent and ceramic powder and other components are added to the solution, so that dispersibility of a slurry can be improved and generation of undissolved resin can be suppressed. Note that solid content concentration cannot be raised and changes of lacquer viscosity tend to become large over time in the case of a solvent other than the above solvents.

In the dielectric slurry, additives selected from a variety of dispersants, plasticizers, antistatic agents, dielectrics, glass flit, and insulators may be included in accordance with need.

In the present embodiment, a dispersant is not particularly limited, but polyethylene glycol based nonionic dispersant is preferably used, and a hydrophile-lipophile balance (HLB) value thereof is 5 to 6. A dispersant is added by 0.5 part by weight or more and 1.5 parts by weight or less, and more-preferably 0.5 part by weight or more and 1.0 part by weight or less with respect to 100 parts by weight of ceramic powder.

When the HLB is out of the above ranges, it is liable that slurry viscosity increases and sheet surface roughness increases. Also, in the case of a dispersant other than a polyethylene glycol based nonionic dispersant, slurry viscosity increases, sheet surface roughness increases and sheet flexibility dec lines, so that it is not preferable.

When an adding quantity of a dispersant is too small, sheet surface roughness tends to increase, while when too large, sheet tensile strength and stackability tend to decline.

In the present embodiment, dioctyl phthalate is preferably used as a plasticizer and contained by an amount of preferably 40 parts by weight or more and 70 parts by weight or less, and more preferably 40 to 60 parts by weight with respect to 100 parts by weight of a binder resin. Comparing with other plasticizers, dioctyl phthalate is preferable in terms of both of sheet strength and sheet stretch and is particularly preferable for having weak peeling strength so as to be easily peeled from a supporting body. Note that when a content of the plasticizer is too small, it is liable that sheet stretch becomes less and flexibility-becomes less. Also, when the content is too large, it is liable that breedout of a plasticizer from a sheet is caused, segregation of the plasticizer against the sheet easily arises and dispersibility of the sheet declines.

Also, in the present embodiment, the dielectric slurry contains water by 1 part by weight or more and 6 parts by weight or less, and preferably 1 to 3 parts by weight with respect to 100 parts by weight of dielectric powder. When a water content is too small, changes of slurry characteristics due to moisture absorbance over time becomes large, which is preferable, slurry viscosity tends to increase and filtration properties of the slurry tend to decline. While when the water content is too large, separation and precipitation of the slurry are caused, the dispersibility becomes poor and surface roughness of the sheet tends to decline.

Furthermore, in the present embodiment, at least any one of a hydrocarbon based solvent, industrial gasoline, kerosene, and solvent naphtha is added by preferably 3 parts by weight or more and 15 parts by weight or less, and more preferably 5 to 10 parts by weight with respect to 100 parts by weight of dielectric powder. By adding these additives, sheet strength and sheet surface roughness can be improved. When an adding quantity of these additives is too small, effects of adding is small, while when the adding quantity is too large, it is liable that sheet strength and sheet surface roughness are deteriorated inversely.

A binder resin is contained preferably by 5 parts by weight or more and 6.5 parts by weight or less with respect to 100 parts by weight of dielectric powder. When a content of the binder resin is too small, it is liable that the sheet strength declines and stackability (adhesiveness at the time of stacking in layers) also declines. While when a content of the binder resin is too large, it is liable that segregation of the binder resin is caused to make the dispersibility worse and sheet surface roughness tends to decline.

When assuming that total volume of the ceramic powder, binder resin and plasticizer is 100 volume %, a volume ratio accounted by the dielectric powder is preferably 62.42% or more and 72.69% or less, and more preferably 63.93% or more and 72.69% or less. When the volume ratio is too small, it is liable that segregation of the binder is easily caused to make the dispersibility worse and surface roughness declines. Also, when the volume ratio is too large, it is liable that the sheet strength declines and the stackability also declines.

Particularly, in the present embodiment, the dielectric slurry preferably includes an antistatic agent, and the antistatic agent is preferably imidazoline based antistatic agent. When the antistatic agent is not an imidazoline based antistatic agent, the antistatic effect is small and the sheet strength, sheet ductility or adhesiveness tends to decline.

An antistatic agent is contained by 0.1 part by weight or more and 0.75 part by weight or less, and more preferably 0.25 to 0.5 part by weight with respect to 100 parts by weight of ceramic powder. When an adding quantity of the antistatic agent is too small, the antistatic effect becomes small, while when too large, it is liable that surface roughness of the sheet declines and sheet strength declines. When the antistatic effect is too small, static electricity easily arises when peeling the carrier film 30 as a supporting body from the ceramic green sheet 10a, and a disadvantage that the green sheet gets wrinkled, etc. easily arises.

Figure 3A:
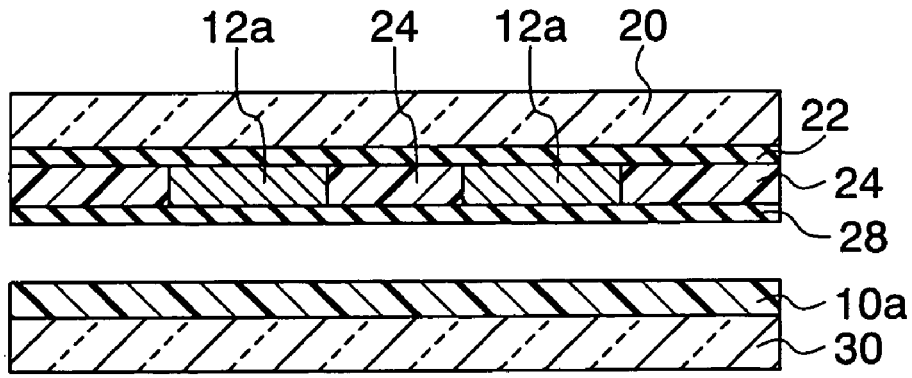
FIG. 3A to FIG. 3C are sectional views of a key part showing steps continued from FIG. 2.

By using the dielectric slurry, for example as shown in FIG. 3A, a green sheet 10a is formed to be a thickness of preferably 0.5 to 30 μm, and more preferably 0.5 to 10 μm or so on the carrier film 30 as a second supporting sheet by the doctor blade method, etc. The green sheet 10a is dried after being formed on the carrier film 30. Temperature of drying the green sheet 10a is preferably 50 to 100° C. and drying time is preferably 1 to 20 minutes. A thickness of the green sheet 10a after drying is contracted to 5 to 25% of that before drying. The thickness of the green sheet after drying is preferably 3 μm or less.

Figure 2A:
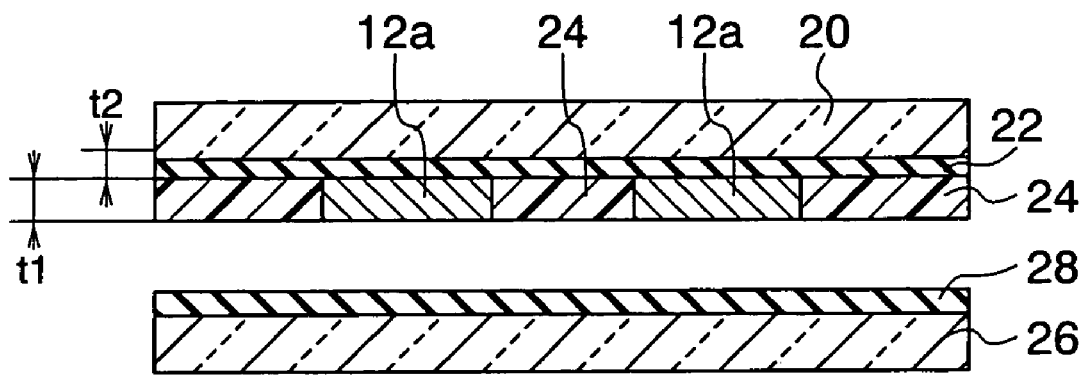
FIG. 2A to FIG. 2C are sectional views of a key part showing a transfer method of an electrode layer.

(2) As shown in FIG. 2A, a carrier film 20 as a first supporting sheet is prepared separately from the carrier film 30, and a release layer 22 is formed thereon. Furthermore, on top thereof, an electrode layer 12a having a predetermined pattern is formed. Before or after that, on a surface of the release layer 22 where the electrode layer 12a is not formed, a blank pattern layer 24 having substantially the same thickness as that of the electrode layer 12a is formed.

As the carrier films 20 and 30, for example, a PET film, etc. is used, and those coated with silicone resin, etc. are preferable to improve the release property. Thicknesses of the carrier films 20 and 30 are not particularly limited and are preferably 5 to 100 μm. The thicknesses of the carrier films 20 and 30 may be same or different.

The release layer 22 preferably contains the same dielectric powder as the dielectric composing the green sheet 10a shown in FIG. 3A. Also, the release layer 22 contains a binder, a plasticizer and a release agent other than the dielectric powder. A particle diameter of the dielectric powder may be the same as that of the dielectric particles included in the green sheet but it is preferable to be smaller.

In the present embodiment, a thickness t2 of the release layer 22 is preferably not more than a thickness of the electrode layer 12a, and more preferably, it is set to be a thickness of 60% or less, and further preferably 30% or less.

A method of applying the release layer 22 is not particularly limited, but it has to be formed to be extremely thin, so that an applying method using, for example, a wire bar coater or a die coater is preferable. Note that adjustment of the release layer thickness can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or emulsion. The binder contained in the release layer 22 may be the same as the binder contained in the green sheet 10a or may be different from that, but preferably the same.

A plasticizer for the release layer 22 is not particularly limited and, for example, phthalate ester, dioctyl phthalate, adipic acid, phosphate ester and glycols, etc. may be mentioned. The plasticizer to be contained in the release layer 22 may be the same as that contained in the green sheet 10a or may be different from that.

A release agent for the release-layer 22 is not particularly limited and, for example, paraffin, wax and silicone oil, etc. may be mentioned. A release agent contained in the release layer 22 may be the same as that contained in the green sheet 10a or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

After forming the release layer 22 on the surface of the carrier film 30, as shown in FIG. 2A, an electrode layer 12a to compose an internal electrode layer 12 after firing is formed to be a predetermined pattern on the surface of the release layer 22. A thickness of the electrode layer 12a is preferably 0.1 to 2 μm, and more preferably 0.1 to 1.0 μm or so. The electrode layer 12a may be configured by a single layer or two or more layers having different compositions.

The electrode layer 12a can be formed on the surface of the release layer 22 by a thick film formation method, such as a printing method using an electrode slurry, or a thin film method, such as evaporation and sputtering. When forming the electrode layer 12a on the surface of the release layer 22 by a screen printing method or a gravure printing method as a kind of thick film method, it is as follows.

First, an electrode slurry is prepared. The electrode slurry is fabricated by kneading a conductive material composed of a variety of conductive metals and alloys, or a variety of oxides, organic metal compounds or resinates, etc. to be conductive materials after firing with an organic vehicle.

As a conductive material to be used when producing the electrode slurry, Ni, a Ni alloy and a mixture of these are used. A shape of the conductive materials is not particularly limited and may be a spherical shape and scale-like shape, etc. or a mixture of these shapes. Those having an average particle diameter of the conductive powder of normally 0.1 to 2 μm, and preferably 0.2 to 1 μm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode paste by preferably 8 to 20 parts by weight with respect to 100 parts by weight of the conductive material (metal powder). As a solvent, any of well-known ones, such as terpionel, butylcarbitol and kerosene, may be used. A content of the solvent is preferably 20 to 55 wt % or so with respect to the entire slurry.

To improve the adhesiveness, the electrode slurry preferably contains a plasticizer. As a plasticizer, benzylbutyl phthalate (BBP) and other phthalate esters, adipic acids, phosphoric esters, and glycols, etc. may be mentioned. The plasticizer in the electrode slurry is preferably 10 to 300 parts by weight, and more preferably 10 to 200 parts by weight with respect to 100 parts by weight of the binder. Note that when an adding quantity of the plasticizer or adhesive is too large, it is liable that strength of the electrode layer 12a remarkably declines. Also, to improve transferability of the electrode layer 12a, it is preferable to improve adhesiveness and/or adherence of the electrode slurry by adding a plasticizer and/or adhesive in the electrode slurry.

After or before forming the electrode layer in a predetermined pattern on the surface of the release layer 22 by a printing method, a blank pattern layer 24 is formed to be substantially the same thickness as that of the electrode layer 12a on the surface of the release layer 22 not formed with the electrode layer 12a. The blank pattern layer 24 is composed of the same material as that of the green sheet 10a shown in FIG. 3A and formed by the same method. The electrode layer 12a and the blank pattern layer 24 are dried in accordance with need. The drying temperature is not particularly limited, but is preferably 70 to 120° C., and the drying time is preferably 5 to 15 minutes.

(3) As shown in FIG. 2A, an adhesive layer transfer sheet formed with an adhesive layer 28 is prepared on the surface of a carrier film 26 as a third supporting sheet separately from the carrier films 20 and 30 explained above. The carrier film 26 is formed by the same sheet as that of the carrier films 20 and 30.

A composition of the adhesive layer 28 is the same as that of the release layer 22 except for not containing a release agent. Namely, the adhesive layer 28 contains a binder, a plasticizer and a release agent. The adhesive layer 28 may contain the same dielectric particle as that of the dielectrics composing the green sheet 10a, however, in the case of forming an adhesive layer having a thinner thickness than a particle diameter of the dielectric particles, it is better not to contain dielectric particles. Also, when dielectric particles are contained in the adhesive layer 28, a particle diameter of the dielectric particles is preferably smaller than the particle diameter of the dielectric particles contained in the green sheet.

A plasticizer is preferably contained in the adhesive layer 28 by 0 to 200 parts by weight, preferably 20 to 200 parts by weight, and more preferably 50 to 100 parts by weight with respect to 100 parts by weight of the binder.

The adhesive layer 28 further contains an antistatic agent, and the antistatic agent includes one of imidazoline based surfactants, and weight based adding quantity of the antistatic agent is preferably not more than that of the binder (organic polymer material). Namely, the antistatic agent is preferably contained in the adhesive layer 28 by 0 to 200 parts by weight, preferably 20 to 200 parts by weight, and more preferably 50 to 100 parts by weight with respect to 100 parts by weight of the binder.

A thickness of the adhesive layer 28 is preferably 0.02 to 0.3 μm or so, more preferably, thinner than an average particle diameter of dielectric particles contained in the green sheet. Also, a thickness of the adhesive layer 28 is preferably 1/10 or less of a thickness of the green sheet 10a.

When a thickness of the adhesive layer 28 is too thin, the adhesive force declines, while when too thick, a space is easily formed inside an element body after sintering depending on the thickness of the adhesive layer, and a capacitance by an amount of the volume tends to decrease remarkably.

The adhesive layer 28 is formed on the surface of the carrier film 26, for example, by a bar coater method, die coater method, reverse roll coater method, dip coater method and kiss coater method, etc. and dried in accordance with need. The drying temperature is not particularly limited, but is preferably the room temperature to 80° C., and the drying time is preferably 1 to 5 minutes.

Figure 2B:
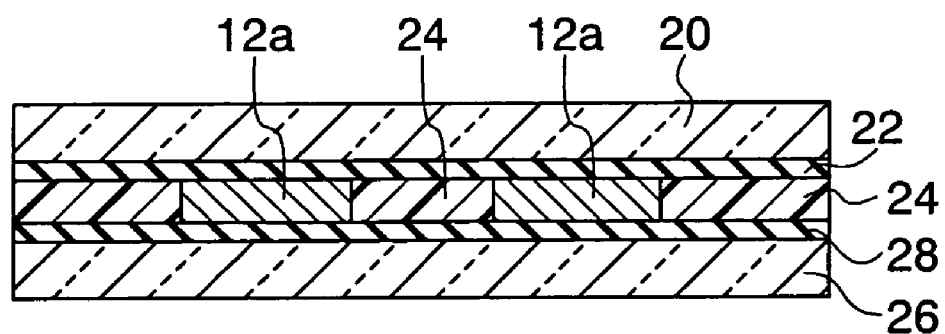
Figure 2C:
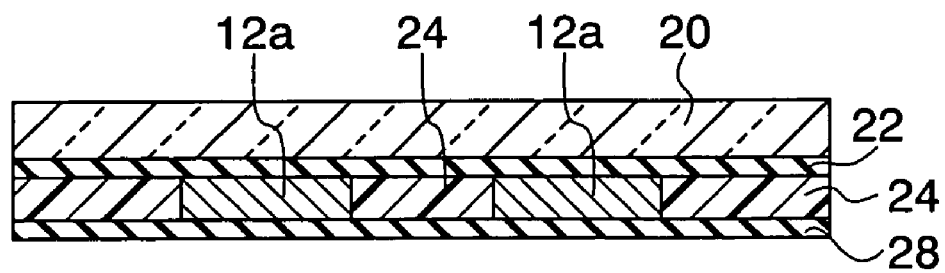

(4) To form the adhesive layer on the surface of the electrode layer 12a and the blank pattern layer 24 shown in FIG. 2A, a transfer method is applied in the present embodiment. Namely, as shown in FIG. 2B, the adhesive layer 28 of the carrier film 26 is pressed against the surface of the electrode layer 12a and the blank pattern layer 24, heated and pressed, then, the carrier film 26 is removed. Consequently, as shown in FIG. 2C, the adhesive layer 28 is transferred to the surface of the electrode layer 12a and the blank pattern layer 24. Note that transfer of the adhesive layer 28 may be performed on the surface of the green sheet 10a shown in FIG. 3A.

The heating temperature at transferring is preferably 40 to 100° C., and the pressing force is preferably 0.2 to 15 MPa. Pressing may be performed by a press or a calendar roll, but is preferably performed by a pair of rolls.

Figure 3B:
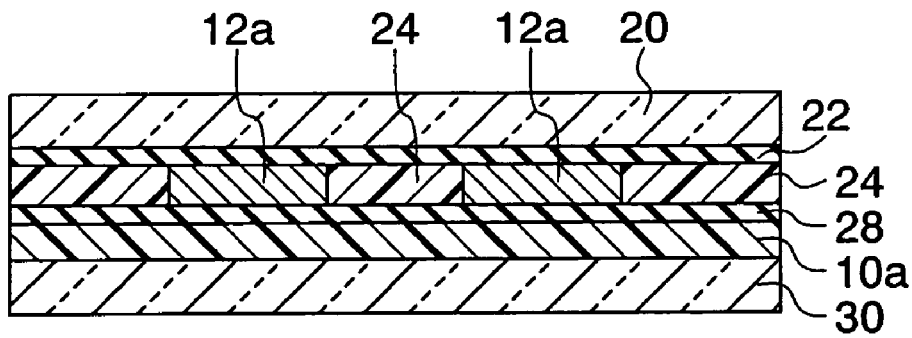
Figure 3C:
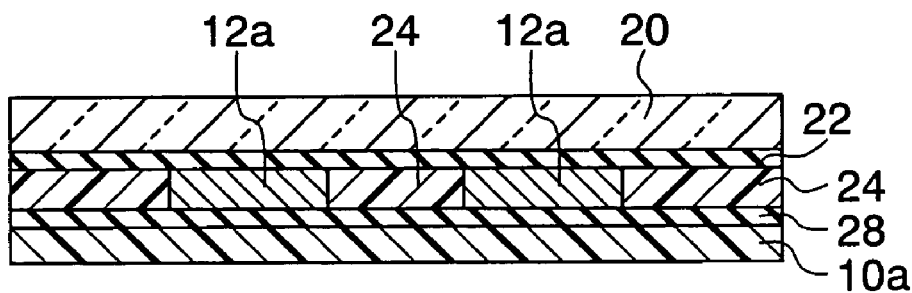

After that, the electrode layer 12a is adhered to the surface of the green sheet 10a formed on the surface of the carrier film (carrier film) 30 shown in FIG. 3A. For that purpose, as shown in FIG. 3B, the electrode layer 12a and the blank pattern layer 24 of the carrier film 20 are pressed via the adhesive layer 28 against the surface of the green sheet 10a together with the carrier film 20, heated and pressed. As a result, as shown in FIG. 3C, the electrode layer 12a and the blank pattern layer 24 are transferred to the surface of the green sheet 10a. Note that since the carrier film 30 on the green sheet side is peeled off, when seeing from the green sheet 10a side, the green sheet 10a is transferred to the electrode layer 12a and the blank pattern layer 24 via the adhesive layer 28.

Heating and pressing at the time of transferring may be pressing and heating by a press or by a calendar roll, but is preferably performed by a pair of rolls. The heating temperature and the pressing force are same as those at the time of transferring the adhesive layer 28.

A single-layer electrode layer 12a in a predetermined pattern is formed on the single green sheet 10a by steps shown in FIG. 2A to FIG. 3C. A green sheet 10a formed with the electrode layer 12a is stacked by repeating the steps shown in FIG. 4A to FIG. 6C. Note that the same reference numbers are given to common members with those shown in FIG. 3A to FIG. 4C, and an explanation thereon is partially omitted.

Figure 4A:
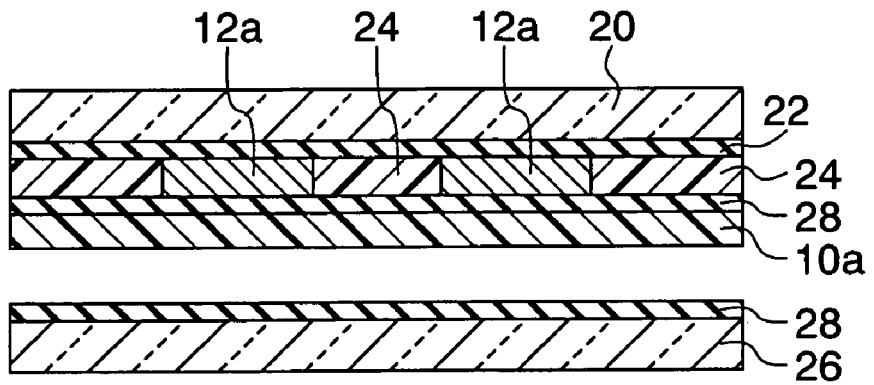
FIG. 4A to FIG. 4C are sectional views of a key part showing a method of stacking a green sheet adhered with an electrode layer.
Figure 4B:
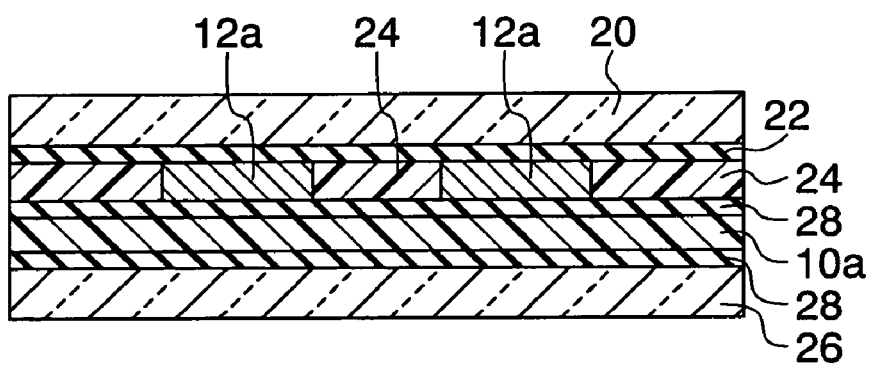
Figure 4C:
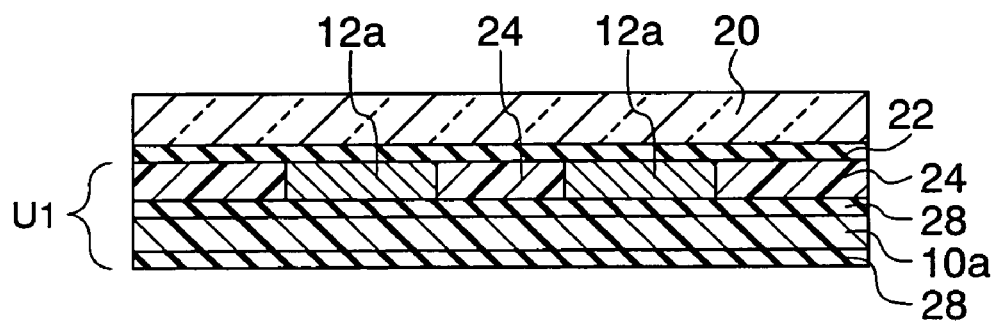
Figure 5A:
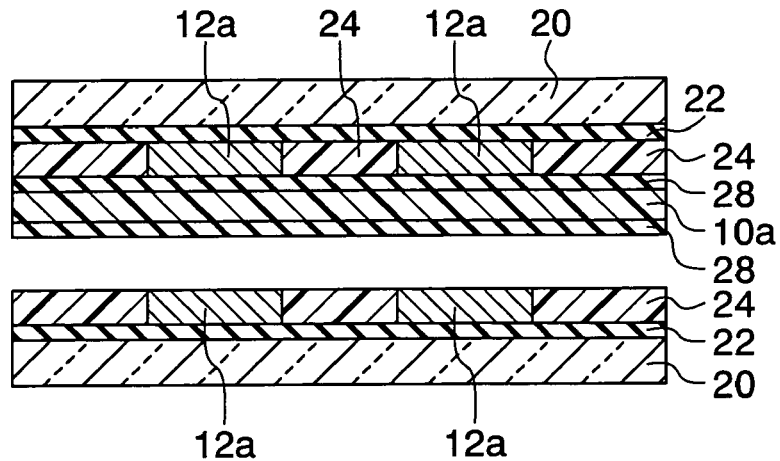
FIG. 5A to FIG. 5C are sectional views of a key part showing a method of stacking a green sheet adhered with an electrode layer, showing steps continued from FIG. 4.
Figure 5B:
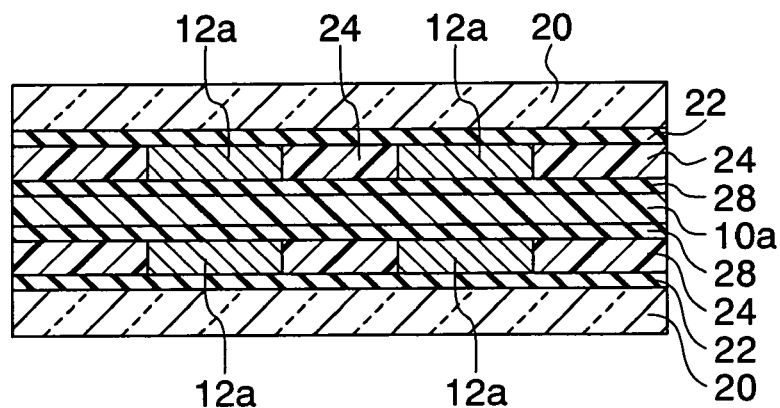
Figure 5C:
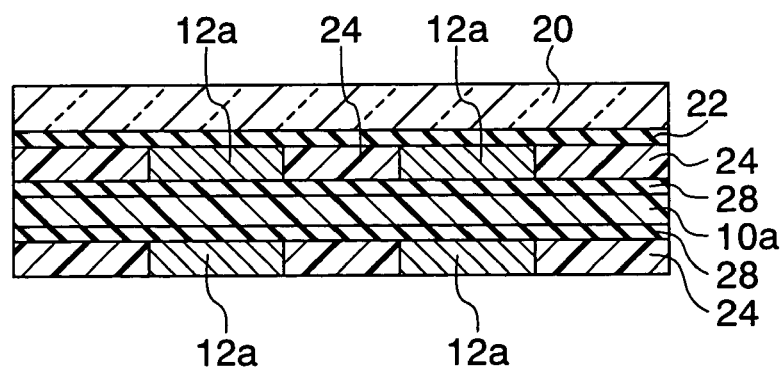

First, as shown in FIG. 4A to FIG. 4C, the adhesive layer 28 is transferred to the surface on the other side of the electrode layer (back side) on the green sheet 10a. After that, as shown in FIG. 5A to FIG. 5C, the electrode layer 12a and the blank pattern layer 24 are transferred to the back side of the green sheet 10a via the adhesive layer 28.

Figure 6A:
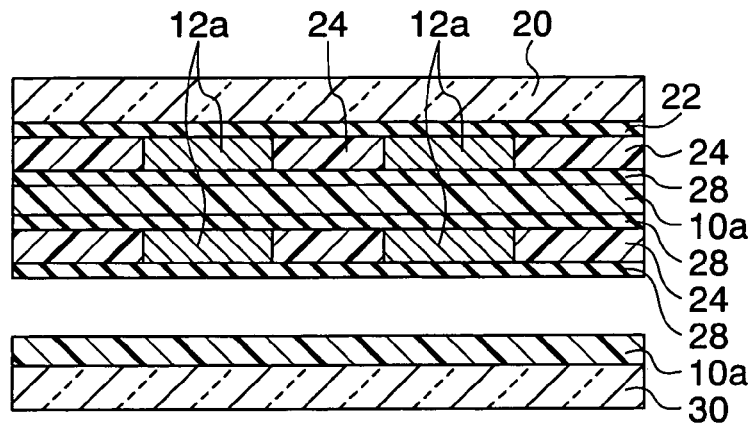
FIG. 6A to FIG. 6C are sectional views of a key part showing steps continued from FIG. 5.
Figure 6B:
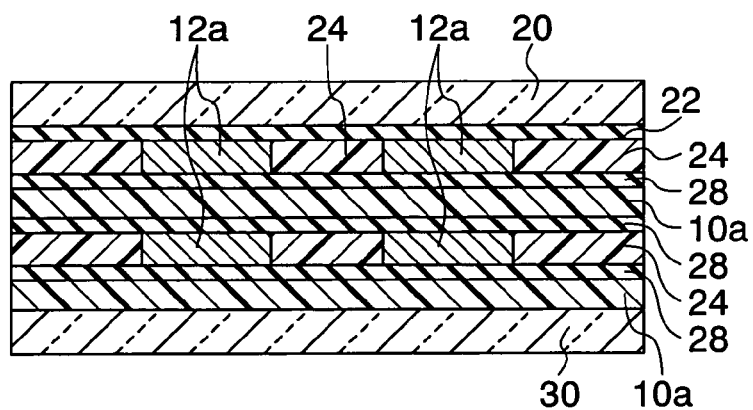
Figure 6C:
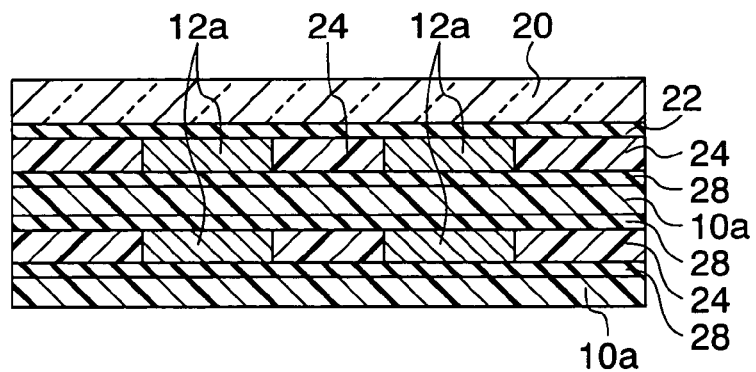
Figure 7:
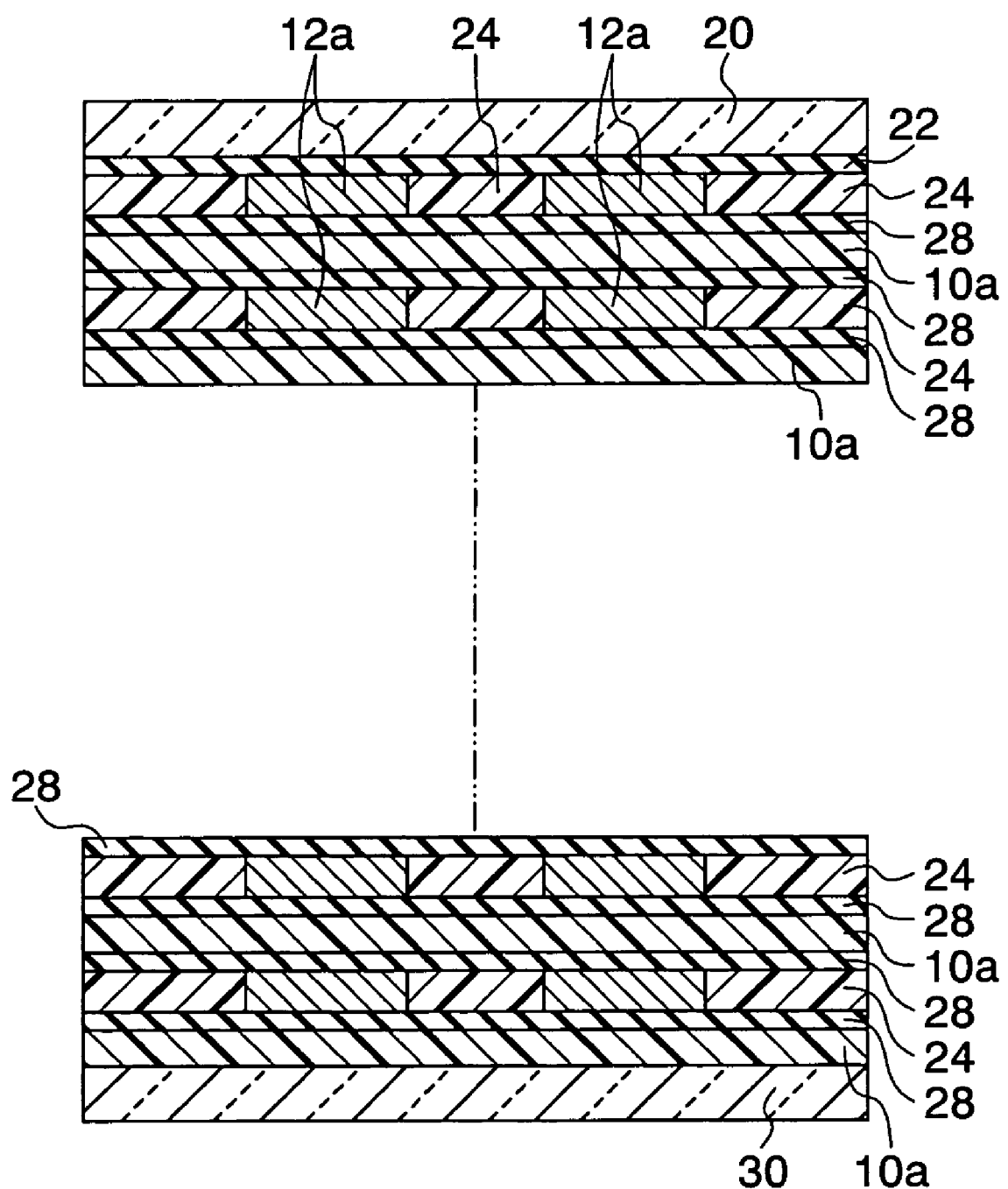
FIG. 7 is a sectional view of a key part showing a step continued from FIG. 6.

Next, as shown in FIG. 6A to FIG. 6C, on the surface of the electrode layer 12a and the blank pattern layer 24, the green sheet 10a is transferred via the adhesive layer 28. After that, by repeating the transfer, a multilayer block, wherein a large number of electrode layers 12a and the green sheet 10a are alternately stacked as shown in FIG. 7, is obtained.

Note that a method below may be used without applying the steps shown in FIG. 5C to FIG. 6C. Namely, from the step shown in FIG. 5B, not to remove the carrier film 20 on the lower side but to remove the carrier film on the upper side, and a multilayer unit U1 shown in FIG. 4C may be stacked thereon. After that, by repeating an operation of removing the carrier film 20 on the upper side again, stacking thereon the multilayer unit U1 shown in FIG. 4C, and removing the carrier film 20 on the upper side, a multilayer block wherein a large number of electrode layers 12a and the green sheet 10a are alternately stacked as shown in FIG. 7 is obtained. A method of stacking the multilayer unit U1 shown in FIG. 4C is superior in terms of an efficiency of the stacking operation.

When the number of stacking layers of the green sheet is small, a firing step in the next step is performed by the multilayer block alone. Also, in accordance with need, a plurality of multilayer blocks as such may be stacked via adhesive layers 28 formed by a transfer method in the same way as above to obtain a multilayer body having larger number of layers.

Figure 8:
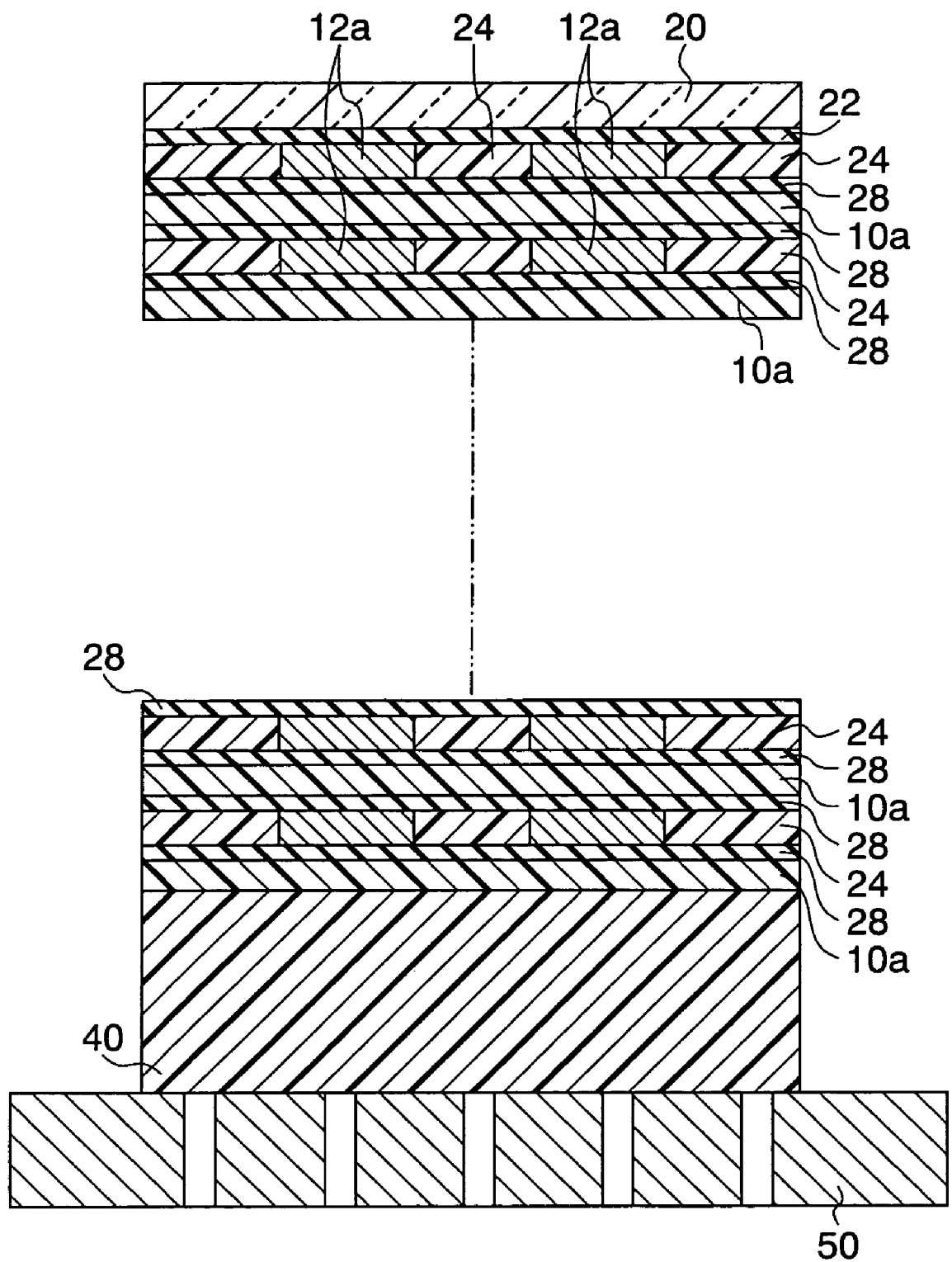
FIG. 8 is a sectional view of a key part showing a step continued from FIG. 7.

(5) After that, as shown in FIG. 8, a green sheet 40 for an outer layer (a thick multilayer body obtained by stacking a plurality of green sheets not formed with an electrode layer) is stacked on the lower surface of the stacked body and the entire stacked body is supported by an absorption holder 50. After that, the carrier film 20 on the upper side is peeled off, the green sheet 40 for an outer layer is formed on top of the multilayer body in the same way, and final pressing is performed.

Pressure at the time of the final pressing is preferably 10 to 200 MPa. Also, the heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour, particularly 10 to 50° C./hour holding temperature: 200 to 400° C., particularly 250 to 350° C.

holding time: 0.5 to 20 hours, particularly 1 to 10 hours atmosphere: a mixed gas of wet $N_2$ and $H_2$ A firing condition is preferably as below.

temperature rising rate: 50 to 500° C./hour, particularly 200 to 300° C./hour holding temperature: 0.1100 to 1300° C., particularly 1150 to 1250° C.

holding time: 0.5 to 8 hours, particularly 1 to 3 hours cooling rate: 50 to 500° C./hour, particularly 200 to 300° C./hour atmosphere gas: a mixed gas of wet $N_2$ and $H_2$, etc.

Note that oxygen partial pressure in an atmosphere in the air at firing is preferably $10^{-2}$ Pa or less, particularly $10^{-2}$ to $10^{-8}$ Pa. When exceeding the above ranges, the internal electrode layer tends to oxidize, while when the oxygen partial pressure is too low, abnormal sintering is caused in an electrode material of the internal electrode layer to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than a higher oxygen partial pressure than a reducing atmosphere at the time of firing, preferably $10^{-3}$ Pa to 1 Pa, and more preferably $10^{-2}$ Pa to 1 Pa. When it is lower than the above range, re-oxidization of the dielectric layer 2 becomes difficult, while when exceeding the above ranges, the internal electrode layer 3 tends to oxidize. Other condition of the thermal treatment is preferably as below.

holding time: 0 to 6 hours, particularly 2 to 5 hours cooling rate: 50 to 500° C./hour, particularly 100 to 300° C./hour atmosphere gas: wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously, the atmosphere is changed without cooling after the binder removal processing, continuously, the temperature is raised to the holding temperature at firing to perform firing. Next, it is cooled and the thermal treatment is preferably performed by changing the atmosphere when the temperature reaches to the holding temperature of the thermal treatment. On the other hand, when performing them separately, after raising the temperature to the holding temperature at the binder removal processing in an atmosphere of a $N_2$ gas or a wet $N_2$ gas, the atmosphere is changed, and the temperature is furthermore raised, when firing. After that, after cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode slurry is burnt to form terminal electrodes 6 and 8. For example, a firing condition of the terminal electrode slurry is preferably in a mixed gas of wet $N_2$ and $H_2$ at 600 to 800° C. for 10 minutes to 1 hour or so. In accordance with need, plating, etc. is performed on the terminal electrodes 6 and 8 to form a pad layer. Note that the terminal electrode paste may be fabricated in the same way as the electrode slurry explained above.

A multilayer ceramic capacitor of the present invention produced as above is mounted on a print substrate, etc. by soldering, etc. and used for a variety of electronic equipments.

In a method of producing a multilayer ceramic capacitor using the dielectric slurry (green sheet slurry) and the green sheet 10a according to the present embodiment, a polyvinyl acetal resin having a polymerization degree in a specific range, a butyralation degree in a specific range and a residual acetyl group amount of a predetermined value or less is used as a binder. Therefore, even an extremely thin green sheet 10a of, for example, 5 μm or less is strong enough to be peeled from the carrier film 30 and has preferable adhesiveness and handlability. Also, surface roughness of the sheet 10a is small and stackability is excellent. Therefore, it becomes easy to stack a large number of green sheets 10a via electrode layers 12a, and it is also possible to stack without the adhesive layers 28 in accordance with need.

Also, in a production method of a multilayer ceramic capacitor using the dielectric slurry (green sheet slurry) and the green sheet 10a according to the present embodiment, a specific kind of dispersant having a specific range of HLB is used. Therefore, even an extremely thin green sheet 10a of, for example, 5 μm or thinner is strong enough to be peeled from the carrier film 30 and has preferable adhesiveness and handlability. Also, surface roughness of the sheet 10a is small and stackability is excellent. Therefore, it becomes easy to stack a large number of green sheets 10a via electrode layers 12a, and it is also possible to stack without the adhesive layers 28 in accordance with need.

Furthermore, in a production method of a multilayer ceramic capacitor using the dielectric slurry (green sheet slurry) and the green sheet 10a according to the present embodiment, an antistatic agent is contained in the dielectric slurry, and the antistatic agent is an imidazoline based antistatic agent. Therefore, even in the case of an extremely thin green sheet 10a of, for example, 5 μm or thinner, it is possible to produce a green sheet 10a having sufficient strength to be peeled from the carrier film 30 as a support body, wherein static electricity generated at the time of being peeled from the carrier film 30 is suppressed, and the adhesiveness and handlability are preferable. Also, surface roughness of the sheet 10a is small and stackability is excellent. Therefore, it becomes easy to stack a large number of green sheets 10a via electrode layers 12a, and it is also possible to stack without the adhesive layers 28 in accordance with need.

Also, in a production method of a multilayer ceramic capacitor according to the present embodiment, a dry type electrode layer 12a can be easily and highly accurately transferred to the surface of the green sheet 10a without damaging or deforming the green sheet 10a.

Furthermore, in the production method of the present embodiment, the adhesive layer 28 is formed on a surface of an electrode layer or a green sheet by a transfer method, and the electrode layer 12a is adhered to the surface of the green sheet 10a via the adhesive layer 28. By forming the adhesive layer 28, at the time of transferring the electrode layer 12a to the surface of the green sheet 10a by adhering, a high pressure and heat become unnecessary and adhesion under a low pressure and low temperature becomes possible. Accordingly, even when the green sheet 10a is extremely thin, the green sheet 10a is not damaged, the electrode layer 12a and the green sheet 10a can be preferably stacked, and a short-circuiting defect, etc. is not caused.

Also, for example, by making an adhesive force of the adhesive layer 28 stronger than adherence force of the release layer 22 and also making the adherence force of the release layer 22 stronger than an adhesive force between the green sheet 10a and the carrier film 30, the carrier film 30 on the green sheet 10a side can be selectively and easily removed.

Furthermore, in the present embodiment, since the adhesive layer 28 is not directly formed on the surface of the electrode layer 12a or green sheet 10a by an applying method, etc. but formed by a transfer method, components of the adhesive layer 28 do not soak in the electrode layer 12a or green sheet 10a and an extremely thin adhesive layer 28 can be formed. For example, a thickness of the adhesive layer 28 can be made as thin as 0.02 to 0.3 μm or so. Even if the thickness of the adhesive layer 28 is thin, components of the adhesive layer 28 do not soak in the electrode layer 12a or green sheet 10a, so that the adhesive force is sufficient. Moreover, an adverse effect is not given to a composition of the electrode layer 12a or green sheet 10a.

Note that the present invention is not limited to the above embodiments and may be variously modified within the scope of the present invention.

For example, a method of the present invention is not limited to the production method of multilayer ceramic capacitors and may be applied as a production method of other multilayer type electronic devices.

EXAMPLES

Below, the present invention will be explained based on further detailed examples, but the present invention is not limited to the examples.

Example 1

Production of Green Sheet Slurry

As a starting material of ceramic powder, $BaTiO_3$ powder (BT-035 and BT-02 made by Sakai Chemical Industry Co., Ltd.) was used. A ceramic powder subcomponent additives were prepared to satisfy $(Ba_{0.6}Ca_{0.4})SiO_3$: 1.48 parts by weight, $Y_2O_3$: 1.01 parts by weight, $MgCO_3$: 0.72 wt %, $Cr_2O_3$: 0.13 wt % and $V_2O_5$: 0.045 wt % with respect to 100 parts by weight of the $BaTiO_3$ powder.

First, only the subcomponents were mixed by a ball-mill to obtain slurry. Namely, the subcomponent additives (total amount 8.8 g) and a solvent (16 g), wherein ethanol/n-propanol is 1:1, were preliminary ground by a ball-mill for 20 hours. Next, the preliminary ground slurry of the subcomponent additives, ethanol: 38 g, n-propanol: 38 g, xylene: 28 g, mineral spirit: 14 g, DOP (dioctyl phthalate) as a plasticizer component: 6 g and a polyethylene glycol based nonionic dispersant (HLB=5 to 6) as a dispersant: 1.4 g were added to $BaTiO_3$: 191.2 g and mixed by a ball-mill for 4 hours. Note that a block polymer of polyethylene glycol and fatty ester was used as the polyethylene glycol based nonionic dispersant (HLB=5 to 6) as a dispersant.

Next, as a binder resin, the dispersion slurry was added with 15% lacquer (BH6 made by Sekisui Chemical Co., Ltd. was dissolved in ethanol/n-propanol=1:1) of BH6 (polybutyral resin: PVB) made by Sekisui Chemical Co., Ltd. by 6 wt % as a solid content (80 g as a lacquer adding quantity). After that, by ball-milling for 16 fours, a ceramic slurry (green sheet slurry) was obtained.

A polymerization degree of a polybutyral resin as the binder resin was 1400, a butyralation degree thereof was 69±3%, and a residual acetyl group amount thereof was 3±2%. The binder resin was contained by 6 parts by weight in the ceramic slurry with respect to 100 parts by weight of ceramic powder (including ceramic powder subcomponent additives). Also, when assuming that total volume of the ceramic powder, binder resin and plasticizer in the ceramic slurry was 100 volume %, the volume ratio accounted by the ceramics powder was 67.31 volume %.

Also, DOP as a plasticizer was contained in the ceramic slurry by 50 parts by weight with respect to 100 parts by weight of the binder resin. Water was contained by 2 parts by weight with respect to 100 parts by weight of the ceramic powder. The polyethylene glycol based nonionic dispersant as a dispersant was contained by 0.7 part by weight with respect to 100 parts by weight of the ceramic powder.

Also, in the slurry, mineral spirit of at least any one of a hydrocarbon based solvent, industrial gasoline, kerosene and solvent naphtha was added by 5 parts by weight with respect to 100 parts by weight of the ceramic powder. Furthermore, the slurry contains an alcohol based solvent and an aromatic solvent as a solvent. When assuming that total weight of the alcohol based solvent and aromatic solvent was 100 parts by weight, toluene as an aromatic solvent was contained by 15 parts by weight.

Viscosity of the slurry was 180 mPa·S. The viscosity of the slurry was measured by using a B-type viscosimeter and using S21 as a rotor, and measurement was made at a temperature of 25° immediately after the slurry was obtained. The rotation rate at the time of measurement was 50 rpm.

Production of Green Sheet

The slurry obtained as above was applied to a PET film as a supporting film to be a thickness of 2 μm by a wire bar coater and dried to produce a green sheet. The applying rate was 50 m/min. and the drying condition was a temperature in the drying furnace of 60° C. to 70° C. and drying time of 2 minutes.

Evaluation of Green Sheet

After that, evaluation was made on sheet density, surface roughness, sheet tensile strength, sheet ductility, adhesiveness (stackability, release strength) and a total evaluation of the green sheet. The results are shown in Table 1.

The adhesiveness was evaluated as below. First, 10 samples obtained by cutting a dried sheet to 50 mm×15 mm were prepared, and 5 sets obtained by adhering (tentative stack) two of the samples each were prepared. Each of the sheet sets were preheated at 70° C. for 5 minutes and adhered under a condition of 70° C. for one minute under about 2 MPa. After that, both surfaces of the sheets of each set were applied two-sided tape, the sheets of each set were pulled in the direction of detaching by using the tensile test machine of Instron 5543, and release strength at the time of being detached was measured. The higher the release strength, the more excellent it is in adhesiveness.

In the total evaluation, those having sheet density of 3.3 g/cm$^3$ or more, surface roughness of 0.6 μm or less, sheet tensile strength of 6.0 MPa or more, sheet ductility of 37% or more, and release strength of adhesiveness of 10 N/cm$^2$ or more were determined to be good (o), and those not satisfying even one of the conditions were determined to be defective (x). Note that "*" in front of a number in the table indicates that it exceeds a preferable range. It is the same also in Tables below.

Comparative Example 1

Other than using polyvinyl acetal resin (PVAc) of a production number BX-1 made by Sekisui Chemical Co., Ltd. as a binder resin, a green sheet was produced in the same way as in the example 1 and the evaluation was made in the same way. The results are shown in Table 1.

Comparative Example 2

Other than using an acrylic resin (MMA-BA) having a molecular weight of 450,000 and a Tg of 70° C. as a binder resin, a green sheet was produced in the same way as in the example 1 and the evaluation was made in the same way. The results are shown in Table 1.

TABLE 1

Table 1 (Selection of Resin)

| | Kind of Resin | Resin Adding Quantity (PHP) | Kind of Plasticizer | Amount of Plasticize (PHR) | Water (PHP) | Dispersant (PHP) | Viscosity (mPa·s) | Sheet Density (g/cm$^3$) | Surface Roughness (μm) | Tensile Strength (MPa) | Sheet Stress (%) | Adhesiveness (N/cm$^2$) | Evaluation |
|---|---|---|---|---|---|---|---|---|---|---|---|---|---|
| Example 1 | PVB | 6 | DOP | 50 | 2 | 0.7 | 180 | 3.4 | 0.55 | 8.2 | 49 | 14.5 | ○ |
| Comparative Example 1 | PVAc | 6 | DOP | 50 | 2 | 0.7 | 230 | 3.3 | *0.62 | 6.6 | *23 | *3.2 | X |
| Comparative Example 2 | Acryl (MMA-BA) | 6 | DOP | 50 | 0 | 0.7 | 200 | 3.4 | 0.51 | *1.2 | 156 | *6.6 | X |

Note that the sheet density was obtained by measuring a thickness of the sheet after drying, measuring weight of the sheet, and dividing the weight of the sheet by the volume. The surface roughness was measured by measuring average surface roughness Rz by using a surface roughness measuring device made by Kosaka Laboratory Ltd. The sheet tensile strength and the sheet ductility were obtained by using a tensile test machine of Instron 5543, preparing 5 sheets cut to be a dumbbell shape as samples, pulling the samples respectively at a tensile rate of 8 mm/min., obtaining strength and stretch at the time of breaking and calculating an average value.

Evaluation 1

As shown in Table 1, it was confirmed that a polyvinyl butyral resin (PVB) was preferable as a binder resin Examples 2 to 3 and Comparative Examples 3 to 5

As shown in Table 2, other than using a polybutyral resin having a different production number (grade) made by Sekisui Chemical Co., Ltd. having a polymerization degree of 300 to 2400, a green sheet was produced in the same way as in the example 1 and the evaluation was made in the same way. The results are shown in Table 2.

TABLE 2

Table 2 (Polimerization Degree)

| | Grade | Polimerization Degree of Resin | Butyralation Degree (±3%) | Residual Acetyl Group ±2% | Resin Adding Quantity (PHP) | Plasticizer | Amount of Plasticizer (PHR) | Water (PHP) |
|---|---|---|---|---|---|---|---|---|
| Comparative Example 3 | BL-1H | 300 | 69 | 3 | 6 | DOP | 50 | 2 |
| Comparative Example 4 | BM-2 | 850 | 68 | 3 | 6 | ↑ | 50 | ↑ |
| Example 2 | BH-S | 1000 | 73 | 5 | 6 | ↑ | 50 | ↑ |
| Example 1 | BH6 | 1400 | 69 | 3 | 6 | ↑ | 50 | ↑ |
| Example 3 | BH3 | 1700 | 65 | 3 | 6 | ↑ | 50 | ↑ |
| Comparative Example 5 | | 2400 | 69 | 3 | 6 | ↑ | 50 | ↑ |

| | Dispersant (PHP) | Viscosity (mPa·s) | Sheet Density (g/cm$^3$) | Surface Roughness (μm) | Sheet Tensile Strength (MPa) | Sheet Stress (%) | Adhesiveness (N/cm$^2$) | Evaluation |
|---|---|---|---|---|---|---|---|---|
| Comparative Example 3 | 0.7 | 180 | 3.51 | 0.47 | *2.7 | 122 | 16.6 | X |
| Comparative Example 4 | ↑ | 170 | 3.43 | 0.52 | *3.3 | 98 | 16 | X |
| Example 2 | ↑ | 180 | 3.43 | 0.53 | 6.1 | 68 | 16.1 | ○ |
| Example 1 | ↑ | 180 | 3.4 | 0.55 | 8.2 | 49 | 14.5 | ○ |
| Example 3 | ↑ | 230 | 3.3 | 0.59 | 8.5 | 43 | 13.1 | ○ |
| Comparative Example 5 | ↑ | 280 | *3.14 | *0.63 | 9.4 | *35 | *8.8 | X |

Evaluation 2

As shown in Table 2, it was confirmed that a preferable polymerization degree of the polybutyral resin was 1000 or higher and 1700 or lower. It was confirmed that, when the polymerization degree was too low, the sheet tensile strength tended to decline, while when the polymerization degree was too high, it was liable that the sheet density declined, sheet surface roughness declined, and sheet ductility and adhesiveness also declined.

Example 3 and Comparative Example 6

As shown in Table 3, other than using a polybutyral resin having a different production number (grade) made by Sekisui Chemical Co., Ltd. having a butyralation degree of 65 to 78, a green sheet was produced in the same way as in the example 1 and the evaluation was made in the same way. The results are shown in Table 3.

TABLE 3

Table 3 (Butyralation Degree) Before Correction

| | Grade | Polimerization Degree of Resin | Butyralation Degree | Residual Acetyl Group | Resin Adding Amount (PHP) | Plasticizer | Amount of Plasticizer (PHR) | Water (PHP) |
|---|---|---|---|---|---|---|---|---|
| Example 3 | BH3 | 1700 | 65 | 3 | 6 | DOP | 50 | 2 |
| Example 1 | BH6 | 1400 | 69 | 3 | 6 | ↑ | 50 | ↑ |
| Comparative Example 6 | | 1400 | 78 | 3 | 6 | ↑ | 50 | ↑ |

| | Dispersant (PHP) | Viscosity (mPa·s) | Sheet Density (g/cm$^3$) | Surface Roughness (μm) | Tensile Strength (MPa) | Sheet Stress (%) | Adhesiveness (N/cm$^2$) | Evaluation |
|---|---|---|---|---|---|---|---|---|
| Example 3 | 0.7 | 230 | 3.3 | 0.59 | 8.5 | 43 | 13.1 | ○ |
| Example 1 | ↑ | 180 | 3.4 | 0.55 | 8.2 | 49 | 14.5 | ○ |
| Comparative Example 6 | ↑ | 350 | *3.1 | *0.66 | 6.8 | 52 | *8.9 | x |

Evaluation 3

As shown in Table 3, it was confirmed that a preferable butyralation degree of the polybutyral resin was 65% or higher and 78% or lower. It was confirmed that when the butyralation degree was too low, the sheet ductility tended to decline, while when too high, sheet surface roughness tended to deteriorate.

Example 3 and Comparative Examples 7 and 8

As shown in Table 4, other than using a polybutyral resin having a different production number (grade) made by Sekisui Chemical Co., Ltd. having a residual acetyl group amount of 3 to 13, a green sheet was produced in the same way as in the example 1 and the evaluation was made in the same way. The results are shown in Table 4.

TABLE 4

Table 4 (Residual Acetyl Group)

| | Grade | Polimerization Degree of Resin | Butyralation Degree | Residual Acetyl Group | Resin Adding Amount (PHP) | Plasticizer | Amount of Plasticizer (PHR) | Water (PHP) |
|---|---|---|---|---|---|---|---|---|
| Example 3 | BH3 | 1700 | 65 | 3 | 6 | DOP | 50 | 2 |
| Comparative Example 7 | BHA | 1700 | 62 | 6 | 6 | ↑ | 50 | ↑ |
| Comparative Example 8 | BHA | 1700 | 58 | 13 | 6 | ↑ | 50 | ↑ |

| | Dispersant (PHP) | Viscosity (mPa·s) | Sheet Density (g/cm$^3$) | Surface Roughness (μm) | Tensile Strength (MPa) | Sheet Stress (%) | Adhesiveness (N/cm$^2$) | Evaluation |
|---|---|---|---|---|---|---|---|---|
| Example 3 | 0.7 | 230 | 3.3 | 0.59 | 8.5 | 43 | 13.1 | ◯ |
| Comparative Example 7 | ↑ | 200 | *3.2 | *0.62 | 8.3 | 47 | 12.2 | X |
| Comparative Example 8 | ↑ | 150 | *3.1 | *0.66 | *8 | 48 | 12.1 | X |

Evaluation 4

As shown in Table 4, it was confirmed that a preferable residual acetyl group amount of the polybutyral resin was less than 6%. It was confirmed that when the residual acetyl group amount was too large, it was liable that the sheet density declined, surface roughness increased and adhesiveness declined.

Examples 4 to 7 and Reference Examples 1 to 7

As shown in Table 5, other than changing an adding weight ratio part handread of pigment (PHP) of the polybutyral resin as a binder resin in a range of 2 to 7 parts by weight with respect to 100 parts by weight of ceramic powder, a green sheet was produced in the same way as in the example 1 and the evaluation was made in the same way. The results are shown in Table 5. Note that the example 6 is the same as the example 1.

TABLE 5

Table 5 (Binder Content)

| | Polimerization Degree of Resin | Butyralation Degree | Residual Acetyl Group | Resin Adding Amount (PHP) | Volume Ratio Volume % | Plasticizer | Amount of Plasticizer (PHR) | Water (PHP) |
|---|---|---|---|---|---|---|---|---|
| Reference Example 1 | 1400 | 69 | 3 | 2 | 86.06 | DOP | 50 | 3 |
| Reference Example 2 | ↑ | ↑ | ↑ | 2.5 | 83.17 | ↑ | ↑ | ↑ |
| Reference Example 3 | ↑ | ↑ | ↑ | 3 | 80.46 | ↑ | ↑ | ↑ |
| Reference Example 4 | ↑ | ↑ | ↑ | 3.5 | 77.92 | ↑ | ↑ | ↑ |
| Reference Example 5 | ↑ | ↑ | ↑ | 4 | 75.54 | ↑ | ↑ | ↑ |

TABLE 5-continued

Table 5 (Binder Content)

| | | | | | | | | |
|---|---|---|---|---|---|---|---|---|
| Reference Example 6 | ↑ | ↑ | ↑ | 4.5 | 73.30 | ↑ | ↑ | ↑ |
| Example 4 | ↑ | ↑ | ↑ | 5 | 71.18 | ↑ | ↑ | ↑ |
| Example 5 | ↑ | ↑ | ↑ | 5.5 | 69.19 | ↑ | ↑ | ↑ |
| Example 6 | ↑ | ↑ | ↑ | 6 | 67.31 | ↑ | ↑ | ↑ |
| Example 7 | ↑ | ↑ | ↑ | 6.5 | 65.52 | ↑ | ↑ | ↑ |
| Reference Example 7 | ↑ | ↑ | ↑ | 7 | 63.83 | ↑ | ↑ | ↑ |

| | Dispersant (PHP) | Viscosity (mPa·s) | Sheet Density (g/cm$^3$) | Surface Roughness (μm) | Tensile Strength (MPa) | Sheet Stress (%) | Adhesiveness (N/cm$^2$) | Evaluation |
|---|---|---|---|---|---|---|---|---|
| Reference Example 1 | 0.7 | 120 | 3.63 | 0.37 | *1.8 | *8.9 | *0 | X |
| Reference Example 2 | ↑ | 130 | 3.62 | 0.37 | *2.3 | *13 | *0 | X |
| Reference Example 3 | ↑ | 150 | 3.61 | 0.38 | *3 | *16 | *1.3 | X |
| Reference Example 4 | ↑ | 150 | 3.59 | 0.39 | *3.9 | *21 | *1.5 | X |
| Reference Example 5 | ↑ | 160 | 3.57 | 0.4 | *4.8 | *26 | *2.2 | X |
| Reference Example 6 | ↑ | 160 | 3.54 | 0.42 | *5.7 | *32 | *6.9 | X |
| Example 4 | ↑ | 170 | 3.51 | 0.43 | 6.4 | 37 | 10.1 | ○ |
| Example 5 | ↑ | 170 | 3.46 | 0.47 | 7.4 | 43 | 12.8 | ○ |
| Example 6 | ↑ | 180 | 3.4 | 0.55 | 8.2 | 49 | 14.5 | ○ |
| Example 7 | ↑ | 190 | 3.33 | 0.6 | 9.7 | 56 | 16.8 | ○ |
| Reference Example 7 | ↑ | 210 | *3.24 | *0.68 | 11.1 | 62 | 18.9 | X |

Evaluation 5

As shown in Table 5, it was confirmed that a preferable adding weight ratio (PHP) of the polybutyral resin as a binder resin was 5 parts by weight or more and 6.5 parts by weight or less with respect to 100 parts by weight of ceramic powder. It was confirmed that when the weight ratio was too low, the tensile strength, sheet ductility and adhesiveness declined, while when the weight ratio was too high, it was liable that the sheet density declined and the surface roughness increased.

Also, when assuming that total volume of the ceramic powder, binder resin and plasticizer was 100 volume %, it was confirmed that a preferable volume ratio accounted by the ceramic powder was 64.3% or more and 72% or less. It was confirmed that when the volume ratio was too low, the sheet density declined and surface roughness increased, inversely, when the volume ratio was too high, it was liable that the tensile strength, sheet ductility and adhesiveness declined.

Examples 8 to 11 and Reference Examples 8 to 18

As shown in Table 6, other than changing an adding weight ratio (part handread of resin (PHR)) of dioctyl phthalate (DOP) as a plasticizer in a range of 30 to 100 parts by weight with respect to 100 parts by weight of a binder resin, a green sheet was produced in the same way as in the example 1 and the evaluation was made in the same way.

Also, as shown in Table 6, other than using dibutyl phthalate (DBP) or benzylbutyl phthalate (BBP) as a plasticizer and changing an adding weight ratio (PHR) of the plasticizer in a range of 30 to 100 parts by weight with respect to 100 parts by weight of a binder resin, a green sheet was produced in the same way as in the example 1 and the evaluation was made in the same way. The results are shown in Table 6. Note that the example 9 is the same as the example 1.

TABLE 6

Table 6 (Kind and Amount of Plasticity)

| | Grade | Polimerization Degree of Resin | Butyralation Degree | Residual Acetyl Group | Resin Adding Amount (PHP) | Plasticizer | Amount of Plasticizer (PHR) | Water (PHP) |
|---|---|---|---|---|---|---|---|---|
| Reference Example 8 | BH-6 | 1400 | 69 | 3 | 6 | DOP | 30 | 2 |
| Example 8 | ↑ | ↑ | ↑ | ↑ | ↑ | ↑ | 40 | ↑ |
| Example 9 | ↑ | ↑ | ↑ | ↑ | ↑ | ↑ | 50 | ↑ |
| Example 10 | ↑ | ↑ | ↑ | ↑ | ↑ | ↑ | 60 | ↑ |
| Example 11 | ↑ | ↑ | ↑ | ↑ | ↑ | ↑ | 70 | ↑ |
| Reference Example 9 | ↑ | ↑ | ↑ | ↑ | ↑ | ↑ | 80 | ↑ |
| Reference Example 10 | ↑ | ↑ | ↑ | ↑ | ↑ | ↑ | 100 | ↑ |

TABLE 6-continued

Table 6 (Kind and Amount of Plasticity)

| | | | | | | | | |
|---|---|---|---|---|---|---|---|---|
| Reference Example 11 | ↑ | ↑ | ↑ | ↑ | ↑ | DBP | 30 | ↑ |
| Reference Example 12 | ↑ | ↑ | ↑ | ↑ | ↑ | ↑ | 50 | ↑ |
| Reference Example 13 | ↑ | ↑ | ↑ | ↑ | ↑ | ↑ | 70 | ↑ |
| Reference Example 14 | ↑ | ↑ | ↑ | ↑ | ↑ | ↑ | 100 | ↑ |
| Reference Example 15 | ↑ | ↑ | ↑ | ↑ | ↑ | BBP | 30 | ↑ |
| Reference Example 16 | ↑ | ↑ | ↑ | ↑ | ↑ | ↑ | 50 | ↑ |
| Reference Example 17 | ↑ | ↑ | ↑ | ↑ | ↑ | ↑ | 70 | ↑ |
| Reference Example 18 | ↑ | ↑ | ↑ | ↑ | ↑ | ↑ | 100 | ↑ |

| | Dispersant (PHP) | Viscosity (mPa·s) | Sheet Density (g/cm$^3$) | Surface Roughness (μm) | Tensile Strength (MPa) | Sheet Stress (%) | Adhesiveness (N/cm$^2$) | Evaluation |
|---|---|---|---|---|---|---|---|---|
| Reference Example 8 | 0.7 | 180 | 3.45 | 0.53 | 8.2 | *33 | *7.2 | X |
| Example 8 | ↑ | 180 | 3.4 | 0.53 | 8.4 | 41 | 10.2 | ○ |
| Example 9 | ↑ | 180 | 3.4 | 0.55 | 8.2 | 49 | 14.5 | ○ |
| Example 10 | ↑ | 180 | 3.34 | 0.56 | 7.1 | 61 | 16.3 | ○ |
| Example 11 | ↑ | 180 | 3.3 | 0.59 | 6.6 | 70 | 18 | ○ |
| Reference Example 9 | ↑ | 170 | *3.25 | *0.62 | *5.6 | 82 | 19.4 | X |
| Reference Example 10 | ↑ | 170 | *3.2 | *0.64 | *4.2 | 104 | 20.2 | X |
| Reference Example 11 | ↑ | 180 | 3.43 | 0.53 | 6.3 | 52 | *0 | X |
| Reference Example 12 | ↑ | 180 | 3.37 | 0.56 | *4.4 | 80 | *0 | X |
| Reference Example 13 | ↑ | 180 | 3.32 | *0.62 | *2.8 | 94 | *3.3 | X |
| Reference Example 14 | ↑ | 170 | *3.24 | *0.67 | *2.3 | 155 | *4.3 | X |
| Reference Example 15 | ↑ | 180 | 3.44 | 0.54 | 7.2 | 51 | *0 | X |
| Reference Example 16 | ↑ | 180 | 3.39 | 0.54 | 6.1 | 87 | *4.5 | X |
| Reference Example 17 | ↑ | 180 | 3.31 | 0.6 | *2.9 | 105 | *6.2 | X |
| Reference Example 18 | ↑ | 170 | *3.28 | *0.64 | *2.5 | 164 | *6.6 | X |

Evaluation 6

As shown in Table 6, it was confirmed that DOP was preferable as a plasticizer and the adding weight ratio was preferably 40 parts by weight or more and 70 parts by weight or less. When the weight ratio was too low, the sheet ductility and adhesiveness declined and when the weight ratio was too high, it was liable that the sheet density declined, surface roughness increased, and tensile strength declined.

Examples 12 to 15 and Reference Examples 19 to 22

As shown in Table 7, other than changing an adding weight ratio (PHP) of water in a range of 0.1 to 10 parts by weight with respect to 100 parts by weight of ceramic powder, a green sheet was produced in the same way as in the example 1 and the evaluation was made in the same way except that a filtration test was added. The results are shown in Table 7. Note that the example 13 is the same as the example 1.

TABLE 7

Table 7 (Water Content)

| | Grade | Polimerization Degree of Resin | Butyralation Degree | Residual Acetyl Group | Resin Adding Amount (PHP) | Plasticizer | Amount of Plasticizer (PHR) | Water (PHP) | Dispersant (PHP) |
|---|---|---|---|---|---|---|---|---|---|
| Reference Example | BH6 | 1400 | 69 | 3 | 6 | DOP | 50 | 0.1 | 0.7 |
| Reference Example | ↑ | ↑ | ↑ | ↑ | 6 | ↑ | ↑ | 0.5 | ↑ |

TABLE 7-continued

Table 7 (Water Content)

| | | | | | | | | | |
|---|---|---|---|---|---|---|---|---|---|
| Example 12 | ↑ | ↑ | ↑ | ↑ | 6 | ↑ | ↑ | 1 | ↑ |
| Example 13 | ↑ | ↑ | ↑ | ↑ | 6 | ↑ | ↑ | 2 | ↑ |
| Example 14 | ↑ | ↑ | ↑ | ↑ | 6 | ↑ | ↑ | 4 | ↑ |
| Example 15 | ↑ | ↑ | ↑ | ↑ | 6 | ↑ | ↑ | 6 | ↑ |
| Reference Example | ↑ | ↑ | ↑ | ↑ | 6 | ↑ | ↑ | 8 | ↑ |
| Reference Example | ↑ | ↑ | ↑ | ↑ | 6 | ↑ | ↑ | 10 | ↑ |

| | Viscosity (mPa·s) | Sheet Density (g/cm³) | Surface Roughness (μm) | Tensile Strength (MPa) | Sheet Stress (%) | Adhesiveness (N/cm²) | Filtration Test (min.sec.) | Evaluation |
|---|---|---|---|---|---|---|---|---|
| Reference Example | 200 | 3.35 | 0.57 | 8 | 47 | 14.2 | *— | X |
| Reference Example | 190 | 3.37 | 0.57 | 8.4 | 48 | 14.4 | *6.46 | X |
| Example 12 | 190 | 3.41 | 0.53 | 8.3 | 49 | 14.7 | 2.50 | ◯ |
| Example 13 | 180 | 3.4 | 0.55 | 8.2 | 49 | 14.5 | 2.25 | ◯ |
| Example 14 | 180 | 3.39 | 0.57 | 8.2 | 49 | 14.4 | 1.56 | ◯ |
| Example 15 | 200 | 3.3 | 0.59 | 8.1 | 50 | 14.6 | 3.44 | ◯ |
| Reference Example | 230 | *3.16 | *0.68 | 8 | 51 | 14.7 | 5.48 | X |
| Reference Example | 230 | *2.93 | *0.76 | 7.4 | 55 | 15.2 | — | X |

Evaluation of a filtration test was made by using as a filter paper a production No. 5C made by Advantech Co., Ltd., wherein a retained particle diameter was 1 μm, and measuring time that 200 g of a green sheet slurry passed through a filter paper area of 28.26 cm². The shorter the passing time is, the more excellent it is in filtration properties. Being excellent in a filtration properties means that flocculant products is a little in the slurry and the binder resin is preferably dissolved. Those with filtration time of 3.50 (min. sec.) or shorter were determined to be good (o) in the total evaluation.

Evaluation 7

As shown in Table 7, it was confirmed that a preferable adding weight ratio of water was 1 part by weight or more and 6 parts by weight or less. When the weight ratio was too low, the filtration properties tended to become deteriorated, while when the weight ratio was too high, it was liable that the sheet density declined and surface roughness increased.

Examples 16 to 22 and Reference Examples 23 to 27

As shown in Table 8, other than changing an adding weight ratio (PHP) of mineral spirit in a range of 1 to 20 parts by weight with respect to 100 parts by weight of ceramic powder, a green sheet was produced in the same way as in the example 1 and the evaluation was made in the same way.

Also, other than changing a kind of a solvent as shown in Table 8 instead of mineral spirit, or not containing this kind of solvent, a green sheet was produced in the same way as in the example 1 and the evaluation was made in the same way. The results are shown in Table 8. Note that the example 20 is the same as the example 1. Also, that MIBK in Table 8 is methyl isobutyl ketone.

TABLE 8

Table 8 (Kind of Solvent)

| | Kind of Solvent | Solvent Adding Amount (PHP) | Viscosity (mPa·s) | Sheet Density (g/cm³) | Surface Roughness (μm) | Tensile Strength (MPa) | Sheet Stress (%) | Adhesiveness (N/cm²) | Evaluation |
|---|---|---|---|---|---|---|---|---|---|
| Example 16 | n-dodecane | 5 | 180 | 3.33 | 0.57 | 7.2 | 43 | 11 | ◯ |
| Example 17 | n-octane | 5 | 180 | 3.42 | 0.57 | 7.9 | 45 | 15.2 | ◯ |
| Example 18 | kerosine | 5 | 180 | 3.38 | 0.58 | 7.5 | 56 | 12.2 | ◯ |
| Reference Example 23 | mineral spirit | 1 | 190 | 3.5 | *0.63 | 8.1 | 40 | *9.4 | X |
| Example 19 | mineral spirit | 3 | 190 | 3.45 | 0.57 | 8.3 | 42 | 12.4 | ◯ |
| Example 20 | mineral spirit | 5 | 180 | 3.4 | 0.55 | 8.2 | 49 | 14.5 | ◯ |
| Example 21 | mineral spirit | 10 | 180 | 3.32 | 0.54 | 7.7 | 51 | 17.3 | ◯ |
| Example 22 | mineral spirit | 15 | 170 | 3.3 | 0.55 | 7.4 | 55 | 20.3 | ◯ |
| Reference Example 24 | mineral spirit | 20 | 180 | *3.21 | *0.61 | 6.5 | 47 | 22.3 | X |
| Reference Example 25 | MIBK | 5 | 180 | 3.42 | *0.63 | 8.7 | *31 | 10.5 | X |
| Reference Example 26 | benzyl zcetate | 5 | 180 | 3.44 | *0.64 | 8.9 | *29 | 11.2 | X |
| Reference Example 27 | none | — | 190 | 3.42 | *0.65 | 8.2 | 38 | *8.5 | X |

Evaluation 8

As shown in Table 8, it was confirmed that it was preferable that at least any one of a hydrocarbon based solvent, industrial gasoline, kerosene and solvent naphtha was added by 3 parts by weight or more and 15 parts by weight or less. It was confirmed that when the weight ratio was too low, it was liable that the surface roughness increased and adhesiveness declined, while when the weight ratio was too high, it was liable that the sheet density declined and surface roughness increased.

Examples 23 to 25 and Reference Examples 28 to 31

As shown in Table 9, other than changing an adding weight ratio of an aromatic solvent (toluene) in a range of 5 to 50 parts by weight by assuming that total weight of an alcohol based solvent (ethanol and propanol) and the aromatic solvent (toluene) was 100 parts by weight, a green sheet was produced in the same way as in the example 1 and evaluation was made in the same way as in the examples 12 to 15. The results are shown in Table 9. Note that the example 24 is same as the example 1.

aromatic solvent, and the aromatic solvent is preferably contained by 10 parts by weight or more and 20 parts by weight or less when assuming that a total weight of the alcohol based solvent and aromatic solvent was 100 parts by weight. It was confirmed that when the weight ratio was too low, it was liable that the surface roughness increased and adhesiveness declined, while when the weight ratio was too high, the filtration properties became deteriorated, sheet density declined, surface roughness increased and tensile strength declined.

Reference Example 32

As shown in Table 10, other than not to obtain a solution by dissolving BH6 (polybutyral resin: PVB) made by Sekisui Chemical Co., Ltd. as a binder resin in an alcohol based solvent, wherein ethanol/n-propanol=1:1, and filtrating in

TABLE 9

Table 9 (Aromatic Solvent)

| | Kind of Solvent | | | | Sheet | Surface | Tensile | Sheet | | Filtration | |
|---|---|---|---|---|---|---|---|---|---|---|---|
| | ethanol (wt %) | propanol (wt %) | toluene (wt %) | Viscosity (mPa·s) | Density (g/cm³) | Roughness (μm) | Strength (MPa) | Stress (%) | Adhesiveness (N/cm²) | Rate (min. sec.) | Evaluation |
| Reference Example 28 | 47.5 | 47.5 | 5 | 200 | 3.36 | *0.67 | 8.5 | 38 | *8.4 | 1.32 | X |
| Example 23 | 45 | 45 | 10 | 190 | 3.4 | 0.57 | 8.3 | 44 | 10.8 | 1.50 | ○ |
| Example 24 | 42.5 | 42.5 | 15 | 180 | 3.4 | 0.55 | 8.2 | 49 | 14.5 | 2.25 | ○ |
| Example 25 | 40 | 40 | 20 | 180 | 3.32 | 0.52 | 7.3 | 51 | 18.4 | 3.12 | ○ |
| Reference Example 29 | 35 | 35 | 30 | 170 | *3.28 | 0.58 | 6.1 | 58 | 20.3 | *6.24 | X |
| Reference Example 30 | 30 | 30 | 40 | 160 | *3.19 | *0.61 | *5.5 | 45 | 23.4 | *— | X |
| Reference Example 31 | 25 | 25 | 50 | 180 | *3.05 | *0.7 | *4.3 | 40 | 27.3 | *— | X |

Evaluation 9

As shown in Table 9, it was confirmed that a solvent in a slurry preferably contains an alcohol based solvent and an advance, and binder resin powder was directly added into a slurry, a green sheet was produced in the same way as in the example 1, and evaluation was made in the same way as in the examples 12 to 15. The results are shown in Table 10.

TABLE 10

Table 10 (Binder Adding Method)

| | Binder Adding Method | Viscosity (mPa·s) | Sheet Density (g/cm³) | Surface Roughness (μm) | Tensile Strength (MPa) | Sheet Stress (%) | Adhesiveness (N/cm²) | Filtration Rate (min. sec.) | Evaluation |
|---|---|---|---|---|---|---|---|---|---|
| Example 1 | added by solution | 180 | 3.4 | 0.55 | 8.2 | 49 | 14.5 | 2.25 | ○ |
| Reference Example 32 | added by powder | 210 | *3.13 | *0.68 | 7.8 | 47 | 13.8 | *— | X |

Evaluation 10

As shown in Table 10, it was confirmed that it was preferable that a binder resin was dissolved in an alcohol based solvent of at least one kind of methanol, ethanol, propanol and butanol and filtered to make a solution in advance, and the above ceramic powder and other components are added to the solution. Otherwise, it was liable that the filtration properties became deteriorated and surface roughness increased.

Examples 1a to 1g

As a dispersant, as shown in Table 11, other than using a nonionic dispersant of sorbitan monostearate (HLB=4 or more and less than 5), a polyethylene glycol based nonionic dispersant (HLB=5 to 6), a nonionic dispersant of polyethylene glycol based polyoxylene stearin ether (HLB=larger than 6 and not more than 7), a polycarboxylate ammonium based dispersant, a maleic acid based dispersant, a sodium dialkylsulfosuccinate as a succinate based dispersant, and polyoxyethylene lauryl aminoether (HLB=9.8) as an amine based dispersant, a green sheet was produced in the same way as in the example 1 and the same evaluation was made. The results are shown in Table 11.

Note that evaluation of the filtration test was made by using as a filter paper a production No. 5C made by Advantech Co., Ltd., wherein a retained particle diameter was 1 μm, and measuring time that 200 g of a green sheet slurry passed through a filter paper area of 28.26 $cm^2$ under pressure of 0.2 MPa. The shorter the passing time is, the more excellent it is in filtration properties. Being excellent in filtration properties means that flocculant products are a little in the slurry and the binder resin is preferably dissolved. Those unable to be measured due to clogging in the measurement of the filtration rate were indicated by "-" in Table 11. It is the same also in Table 12.

TABLE 11

Table 11 (Kind of Dispersant)

| | Kind of Dispersant | Dispersant (PHP) | Viscosity (mPa·s) | Sheet Density (g/cm³) | Surface Roughness (μm) | Tensile Strength (MPa) | Sheet Stress (%) | Adhesiveness (N/cm²) | Filtration Rate (min. sec.) | Evaluation |
|---|---|---|---|---|---|---|---|---|---|---|
| Example 1a | sorbitan monostearate HLB = 4 to 5 | 0.7 | 250 | *3.22 | *0.64 | 7.7 | 45 | 16.6 | — | X |
| Example 1b | polyethylene glycol based HLB = 5 to 6 | 0.7 | 180 | 3.4 | 0.55 | 8.2 | 49 | 14.5 | 2.25 | ○ |
| Example 1c | polyethylene glycol based HLB = 6 to 7 | 0.7 | 220 | *3.25 | *0.66 | 6.7 | 42 | 15.3 | — | X |
| Example 1d | polycarboxylate based | 0.7 | 240 | 3.43 | 0.5 | 6.6 | *31 | 14.3 | 3.44 | X |
| Example 1e | maleic acid based | 0.7 | 250 | 3.41 | 0.51 | 6.5 | *32 | 16.5 | — | X |
| Example 1f | succinate based | 0.7 | 250 | *3.29 | *0.63 | 7.5 | 42 | 16 | — | X |
| Example 1g | amine based | 0.7 | 320 | *3.12 | *0.66 | 6.4 | *36 | 15.5 | — | X |

Evaluation 11

As shown in Table 11, it was confirmed that a polyethylene glycol based nonionic dispersant (HLB=5 to 6) was the most preferable as a dispersant.

Note that in the total evaluation in the Table 11, those having sheet density of 3.3 g/$cm^3$ or more, surface roughness of 0.6 μm or less, sheet tensile strength of 6.0 MPa or more, sheet ductility of 37% or more, release strength of adhesiveness of 8.9 N/$cm^2$ or more, and filtration rate (filtration time) of 4.50 (min. sec.) or shorter were determined to be good (o), and those not satisfying even one of the conditions were determined to be defective (x). The determination is the same also in Table 12.

Examples 1h to 1m

Other than changing a content of a dispersant in a range of 0.2 to 2 parts by weight with respect to 100 parts by weight of ceramic powder, a green sheet was produced in the same way as in the example 1b and evaluation was made in the same way. The results are shown in Table 12.

TABLE 12

Table 12 (Amount of Dispersant)

| | Kind of Dispersant | Dispersant (PHP) | Viscosity (mPa·s) | Sheet Density (g/cm³) | Surface Roughness (μm) | Tensile Strength (MPa) | Sheet Stress (%) | Adhesiveness (N/cm²) | Filtration Rate (min. sec.) | Evaluation |
|---|---|---|---|---|---|---|---|---|---|---|
| Example 1h | polyethylene glycol based HLB = 5 to 6 | 0.2 | 280 | *3.29 | *0.61 | 8.2 | 59 | 14.4 | — | X |
| Example 1i | ↑ | 0.5 | 220 | 3.35 | 0.58 | 8.3 | 53 | 14.2 | 4.12 | ○ |

TABLE 12-continued

Table 12 (Amount of Dispersant)

| | Kind of Dispersant | Dispersant (PHP) | Viscosity (mPa·s) | Sheet Density (g/cm³) | Surface Roughness (μm) | Tensile Strength (MPa) | Sheet Stress (%) | Adhesiveness (N/cm²) | Filtration Rate (min. sec.) | Evaluation |
|---|---|---|---|---|---|---|---|---|---|---|
| Example 1j | ↑ | 0.7 | 180 | 3.4 | 0.55 | 8.2 | 49 | 14.5 | 2.25 | ○ |
| Example 1k | ↑ | 1 | 130 | 3.58 | 0.49 | 7.6 | 45 | 10.3 | 1.4 | ○ |
| Example 1l | ↑ | 1.5 | 100 | 3.63 | 0.46 | 6.9 | 41 | 8.9 | 1.32 | ○ |
| Example 1n | ↑ | 2 | 90 | 3.53 | 0.51 | *5.3 | 37 | *6.6 | 2.21 | X |

Evaluation 12

As shown in Table 12, it was confirmed that a content of a dispersant was preferably in a range of 0.5 to 1.5 parts by weight, and more preferably in a range of 0.5 to 1.0 part by weight with respect to 100 parts by weight of ceramic powder.

Examples 1n to 1y

As shown in Table 13, other than adding a variety of antistatic agents in a green sheet slurry by variable parts by weight (PHP) with respect to 100 parts by weight of ceramic powder, a green sheet was produced in the same way as in the example 1 and evaluation was made in the same way. The results are shown in Table 13.

Note that static electricity (electrification property) was evaluated as below. Namely, measurement was made by using S55-1 made by SHINKO corporation at a distance from the green sheet 1 cm immediately after removing the green sheet. The measurement value is a value measured after 5 seconds from removal. The less the static electricity (kV) to be generated is, the more preferable. When static electricity generates, the sheet gets wrinkled, so that stacking with high accuracy becomes difficult.

glycol based antistatic agent, and a product made by NOF Corporation was used as PEG400.

Evaluation 13

As shown in Table 13, it was confirmed that an imidazoline based surfactant was preferable as an antistatic agent. Moreover, as shown in Table 13, it was confirmed that when an adding quantity of the antistatic agent was too small, the antistatic effect became small, while when too large, the surface roughness of the sheet became deteriorated and sheet strength declined.

Note that in the total evaluation shown in Table 13, those having sheet density of 3.3 g/cm³ or more, surface roughness of 0.6 μm or less, sheet tensile strength of 6.0 MPa or more, sheet ductility of 40% or more, release strength of adhesiveness of 9 N/cm² or more, and static electricity of 36 or less were determined to be good (o), those not satisfying even one of the conditions were determined to be defective (x), and those not satisfying the above standard only in the electrostatic evaluation item were determined to be (Δ).

As explained above, according to the present invention, it is possible to provide a green sheet slurry, a green sheet, a production method of a green sheet slurry and a production

TABLE 13

Table 13 (Antistatic Agent)

| | Kind of Antistatic Agent | Adding Amount (PHP) | Viscosity (mPa·s) | Sheet Density (g/cm³) | Surface Roughness (μm) | Tensile Strength (MPa) | Sheet Stress (%) | Adhesiveness (N/cm²) | Static electricity (kV) | Evaluation |
|---|---|---|---|---|---|---|---|---|---|---|
| Example 1n | amine based | 0.5 | 180 | 3.38 | 0.57 | *5.8 | 41 | 17 | 27 | X |
| Example 1o | imidazoline based | 0.05 | 180 | 3.4 | 0.53 | 8.2 | 49 | 14 | *55 | Δ |
| Example 1p | ↑ | 0.1 | 180 | 3.41 | 0.53 | 8.2 | 49 | 14 | 36 | ○ |
| Example 1q | ↑ | 0.25 | 180 | 3.4 | 0.54 | 8.1 | 47 | 15 | 29 | ○ |
| Example 1r | ↑ | 0.5 | 180 | 3.4 | 0.54 | 8.2 | 49 | 14 | 22 | ○ |
| Example 1s | ↑ | 0.75 | 180 | 3.35 | 0.57 | 7.5 | 42 | 15 | 16 | ○ |
| Example 1t | ↑ | 1 | 180 | *3.26 | *0.61 | 6.0 | *34 | 15 | 5.6 | X |
| Example 1u | polyethylene glycol based | 0.5 | 180 | 3.41 | 0.55 | 7.8 | *38 | 15 | 36 | X |
| Example 1v | PEG400 | 0.5 | 180 | 3.39 | 0.58 | 6.3 | *36 | 16 | *46 | X |
| Example 1w | 2-3 butanediol | 0.5 | 180 | 3.4 | 0.56 | 8.9 | *22 | *4 | *71 | X |
| Example 1x | glycerin | 0.5 | 180 | 3.38 | 0.59 | *4.3 | *18 | 10 | *70 | X |
| Example 1y | none | — | 180 | 3.4 | 0.55 | 8.2 | 49 | 14 | *72 | Δ |

In Table 13, octadecyl amine acetate was used as an amine based surfactant, 1-hydroxyethyl 2-alkylimidazoline quarternary salt was used as an imidazoline based surfactant, polyethylene glycol dodecyl ether was used as a polyethylene method of a green sheet capable of producing a green sheet having enough strength to be removed from a supporting body, preferable adhesiveness and handlability even if the green sheet is extremely thin. Therefore, it is possible to provide a production method of an electronic device suitable to be made thinner and multilayer.

The invention claimed is:

1. A green sheet slurry, including ceramic powder, a binder resin, a plasticizer and a solvent, wherein said binder resin contains a polyvinyl butyral resin, a polymerization degree of the polybutyral resin is 1000 or more and 1700 or less, a nominal value of a butyralation degree of the resin is 65% or higher and 78% or lower, and a residual acetyl group amount is smaller than 6%, the ceramic powder is a dielectric material, said binder resin is contained by 5 parts by weight or more and 6.5 parts by weight or less with respect to 100 parts by weight of said ceramic powder, said slurry contains dioctyl phthalate as said plasticizer by 40 parts by weight or more and 70 parts by weight or less with respect to 100 parts by weight of said binder resin water is added to said slurry by 1 part by weight or more and 6 parts by weight or less with respect to 100 parts by weight of said ceramic powder, and said solvent contains an alcohol-based solvent and an aromatic solvent, and the aromatic solvent is contained by 10 parts by weight or more and 20 parts by weight or less when assuming that total weight of the alcohol-based solvent and the aromatic solvent is 100 parts by weight.

2. The green sheet slurry as set forth in claim 1, characterized in that, when assuming that total volume of said ceramic powder, binder resin and plasticizer is 100 volume %, a volume ratio accounted by said ceramic powder is 64.3% or higher and 72% or lower.

3. The green sheet slurry as set forth in claim 1, wherein:

the green sheet slurry further includes a dispersant;

said dispersant contains polyethylene glycol based nonionic dispersant, and a hydrophile-lipophile balance value is 5 to 6; and said dispersant is added by 0.5 part by weight or more and 1.5 parts by weight or less with respect to 100 parts by weight of ceramic powder.

4. The green sheet slurry as set forth in claim 1, wherein the green sheet slurry further includes an antistatic agent, and said antistatic agent contains an imidazoline based antistatic agent, and said antistatic agent is contained by 0.1 part by weight or more and 0.75 part by weight or less with respect to 100 parts by weight of said ceramic powder.

5. A production method of a green sheet slurry, for producing a green sheet slurry as set forth in claim 1, characterized in that said binder resin is dissolved in an alcohol based solvent of at least one kind of methanol, ethanol, propanol and butanol and filtered to make a solution in advance, and said ceramic powder and other components are added to the solution.

6. A production method of a ceramic green sheet, including the steps of:

preparing a green sheet slurry as set forth in claim 1; and forming a ceramic green sheet by using said green sheet slurry.

7. A production method of a ceramic electronic device, including the step of:

preparing a green sheet slurry as set forth in claim 1;

forming a ceramic green sheet by using said green sheet slurry;

drying said green sheet;

stacking dried green sheets via internal electrode layers to obtain a green chip; and firing said green chip.

* * * * *